(12) United States Patent
Sakai

(10) Patent No.: US 7,076,195 B2
(45) Date of Patent: Jul. 11, 2006

(54) ENDLESS BELT UNIT, IMAGE FORMING APPARATUS, AND METHOD OF DRIVING AND CONTROLLING BELT MEMBER

(75) Inventor: Yoshihiro Sakai, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 202 days.

(21) Appl. No.: 10/701,428

(22) Filed: Nov. 6, 2003

(65) Prior Publication Data
US 2004/0141775 A1    Jul. 22, 2004

(30) Foreign Application Priority Data
Nov. 6, 2002 (JP) .............................. 2002-322577
Sep. 30, 2003 (JP) .............................. 2003-341056

(51) Int. Cl.
*G03G 15/01* (2006.01)
(52) U.S. Cl. ........................................ 399/301; 347/116
(58) Field of Classification Search ................ 399/301, 399/165, 49, 72; 347/116
See application file for complete search history.

(56) References Cited

U.S. PATENT DOCUMENTS

| | | | |
|---|---|---|---|
| 4,664,501 A | 5/1987 | Koizumi et al. | |
| 4,717,965 A | 1/1988 | Mashiko et al. | |
| 4,742,371 A | 5/1988 | Furuta et al. | |
| 4,746,950 A | 5/1988 | Mamizuka et al. | |
| 4,750,017 A | 6/1988 | Sakai | |
| 4,796,050 A | 1/1989 | Furuta et al. | |
| 4,922,301 A | 5/1990 | Katoh et al. | |
| 4,933,727 A | 6/1990 | Mizuma et al. | |
| 5,121,170 A | 6/1992 | Bannai et al. | |
| 5,160,969 A | 11/1992 | Mizuma et al. | |
| 5,266,976 A * | 11/1993 | Ohigashi et al. | 347/116 |
| 5,321,475 A | 6/1994 | Horiuchi et al. | |
| 5,545,381 A | 8/1996 | Iida et al. | |
| 5,612,766 A | 3/1997 | Iida et al. | |
| 5,631,691 A | 5/1997 | Furuta et al. | |
| 5,819,143 A | 10/1998 | Sakai et al. | |
| 5,825,398 A | 10/1998 | Furuta et al. | |
| 5,903,805 A * | 5/1999 | Ueda et al. | 399/165 |
| 5,926,670 A | 7/1999 | Furuta et al. | |
| 5,937,232 A | 8/1999 | Taguchi et al. | |
| 6,057,869 A | 5/2000 | Kawaishi et al. | |
| RE37,197 E | 5/2001 | Iida et al. | |
| 6,456,311 B1 * | 9/2002 | Harush et al. | 347/116 |
| 6,603,495 B1 * | 8/2003 | Hayakawa | 347/116 |

(Continued)

FOREIGN PATENT DOCUMENTS

JP       10-31373       2/1998

(Continued)

OTHER PUBLICATIONS

U.S. Appl. No. 10/150,932, filed May 21, 2002, Sakai.

(Continued)

*Primary Examiner*—Susan Lee
(74) *Attorney, Agent, or Firm*—Oblon, Spivak, McClelland, Maier & Neustadt, P.C.

(57) ABSTRACT

A belt unit includes a belt member, scale marks, a scale mark detector, a reference mark, and a reference mark detector. The belt member makes an endless movement while being stretched by stretching members. The scale mark detector detects the scale marks, and the reference mark is provided at a predetermined position on the surface of the belt member. The reference mark detector detects whether the reference mark is present at the predetermined position.

15 Claims, 16 Drawing Sheets

U.S. PATENT DOCUMENTS 6,661,440 B1 * 12/2003 Nishigaki et al. ............ 347/116
6,714,224 B1 *  3/2004 Yamanaka et al. .......... 347/116
6,816,178 B1 * 11/2004 Yamada et al. ............. 347/116
6,829,465 B1 * 12/2004 Yamanaka et al. .......... 399/301

FOREIGN PATENT DOCUMENTS

| JP | 11-24507 | 1/1999 |
| JP | 2000-97374 | 4/2000 |
| JP | 2002-108037 | 4/2002 |

OTHER PUBLICATIONS

U.S. Appl. No. 10/244,706, filed Sep. 17, 2002, Kimura.
U.S. Appl. No. 10/927,344, filed Aug. 27, 2004, Takayama et al.
U.S. Appl. No. 10/942,877, filed Sep. 17, 2004, Sakai.

* cited by examiner

ENDLESS BELT UNIT, IMAGE FORMING APPARATUS, AND METHOD OF DRIVING AND CONTROLLING BELT MEMBER

CROSS-REFERENCE TO RELATED APPLICATIONS

The present document incorporates by reference the entire contents of Japanese priority documents, 2002-322577 filed in Japan on Nov. 6, 2002 and 2003-341056 filed in Japan on Sep. 30, 2003.

BACKGROUND OF THE INVENTION

1) Field of the Invention

The present invention relates to a belt unit including a belt member and a plurality of belt stretching members that stretch and support the belt member to make an endless movement, an image forming apparatus including the belt unit, and a method of driving and controlling the belt member.

2) Description of the Related Art

An image forming apparatus that forms a multi-color toner image by superposing a plurality of single-color toner images on an endless belt member (surface of the belt or a paper carried thereon) is currently in use. The method of superposing single-color toner images on the belt member includes a transfer method and a direct recording method. The transfer method has two types: one employs one image carrier; and the other employs a plurality of image carriers.

An example of the image forming apparatus that superposes single-color toner images using the transfer method employing one image carrier is disclosed in Japanese Patent Application Laid Open No. 2002-108037. In this image forming apparatus, single-color toner images of different colors are formed on a photosensitive element using an electrophotographic process each time an intermediate transfer belt make one lap of movement, and these toner images are superposed on the intermediate transfer belt.

Japanese Patent Application Laid Open No. Hei 10-31373 discloses an image forming apparatus that superposes single-color toner images using the transfer method employing a plurality of image carriers. In this image forming apparatus, single-color toner images of different colors are formed respectively on a plurality of photosensitive elements that are arranged opposite to the intermediate transfer belt using the electrophotographic process, and these toner images are sequentially superposed on the intermediate transfer belt that makes an endless movement.

Japanese Patent Application Laid Open No. 2000-94374 discloses an image forming apparatus that superposes single-color toner images using a direct recording method. In this image forming apparatus, a toner image is formed without using the electrophotographic process in which an electrostatic latent image is developed with toner. More specifically, a plurality of image forming units are provided in the image forming apparatus, each of which is capable of directly recording the toner image on an intermediate recording belt by spraying a bunch of toner in the form of dots through a plurality of holes provided in an electronic board. The intermediate recording belt is endlessly moved along the positions facing these image forming units. The single-color toner images of different colors are sequentially superposed on the intermediate recording belt, and a color image is recorded thereon.

In all of the methods, the speed in the endless movement of the belt member is changed by deviation in thickness of the belt member in the circumferential direction, a decentered axis of a belt drive motor or a gear, a pitch error of the gear, an engagement error of the gear, etc. If the speed of the belt member is changed, the toner images are misaligned on the belt member as a result of inaccurate superposition. The misalignment due to the inaccurate superposition of the toner images results in irregularities in color of a multi-color toner image. The purpose of superposition of toner images is to obtain a multi-color toner image. However, a multi-color toner image may be obtained by superposing toner images of the same color for some reason. In this case, the misalignment of the toner images causes the shape of the image to be largely deformed. Further, even if a monochrome image is to be formed, the quality of the image finally formed on a paper may be degraded by the change in the speed during transfer of the image.

On the other hand, Japanese Patent Application Laid Open No. Hei 11-24507 discloses a technology of using an intermediate recording belt with a scale having a plurality of scale marks at predetermined pitches in the circumferential direction of the belt member. In this technology, the speed of the intermediate recording belt is controlled based on a result of reading the scale marks to minimize the change in belt speed. By employing such a configuration, it is possible to minimize the misalignment of the toner images in superposition due to the change in the belt speed.

However, it is extremely difficult to precisely adjust pitches each between scale marks (hereinafter, "scale pitch") of the scale provided on the belt member to each other. For example, in the image forming apparatus disclosed in Japanese Patent Application Laid Open No. Hei 11-24507, a scale seal made of a plastic sheet on which scale marks are formed by a laser or the like, is adhered to the periphery of the belt member. If the scale seal is adhered to the belt member in such a manner that small wrinkles occur, the scale pitch at a wrinkled portion goes out of adjustment.

Furthermore, there is no way to prevent occurrence of any circumferential error in the belt member. If the circumferential error occurs, the front end and the rear end of the scale seal, which is wound along the belt member, are not perfectly joined to each other. Therefore, both of the ends may be overlapped or largely separated from each other, and a scale pitch goes out of adjustment at a joint.

There is also a method of directly writing scale marks on the surface of the belt member by printing or laser machining without using the scale seal. However, if the circumferential error occurs, a pitch between an initially written scale mark and a finally written scale mark goes out of adjustment by no means. Further, there is another method of forming linear toner images at a specific pitch along the edge of the belt member in its lateral direction each time an image is formed, and using the toner images as scale marks. However, as explained above, the obtained pitch between an initially written linear toner image and a finally written linear toner image is inevitably different from the others.

As explained above, even if the scale marks are calibrated on the belt member by using any of the methods, the difference in the pitch between the scale marks is not avoided if an error occurs in the circumference of the belt member.

If any abnormality occurs in the scale pitch due to the above-mentioned conditions, a detected scale pitch is changed due to a part where the abnormality occurs (hereinafter, "abnormal part"), and this change is incorrectly detected as if this change is caused by the change in speed of the belt member. Therefore, the drive control of the belt reflects the result of the incorrect detection. Consequently, although the belt is actually driven at a constant speed, the speed may possibly be changed, which may in turn foster the change in the speed.

SUMMARY OF THE INVENTION

It is an object of the present invention to solve at least the problems in the conventional technology.

The belt unit according to one aspect of the present invention includes a belt member that makes an endless movement, a plurality of scale marks arranged on a surface of the belt member in a circumferential direction, a scale mark detector that detects the scale marks, a reference mark provided at a predetermined position on the surface of the belt member, and a reference mark detector that detects the reference mark.

The image forming apparatus according to another aspect of the present invention includes a belt member that makes an endless movement, a plurality of scale marks arranged on a surface of the belt member in a circumferential direction, a scale mark detector that detects the scale marks, a reference mark provided at a predetermined position on the surface of the belt member, a reference mark detector that detects the reference mark, a belt drive controller that controls driving of the belt member based on results of detections by the scale mark detector and the reference mark detector, and an image forming unit that forms a toner image on the belt member.

The method for controlling driving of a belt member, which is for an image forming apparatus that includes the belt member that makes an endless movement, a plurality of scale marks arranged on a surface of the belt member in a circumferential direction, a reference mark provided at a predetermined position on the surface of the belt member, and an image forming unit that forms a toner image on the belt member, according to still another aspect of the present invention includes detecting the scale marks, detecting the reference mark, and controlling the driving of the belt member based on results of detecting the scale marks and detecting the reference mark.

The other objects, features and advantages of the present invention are specifically set forth in or will become apparent from the following detailed descriptions of the invention when read in conjunction with the accompanying drawings.

DETAILED DESCRIPTION

Exemplary embodiments of a belt unit, an image forming apparatus, and a method of controlling drive of a belt member according to the present invention are explained in detail below with reference to the accompanying drawings.

One embodiment of a tandem type color laser copying machine (hereinafter, "copying machine") is explained below. This copying machine is provided as an image forming apparatus to which the present invention is applied, and has a plurality of photosensitive elements arranged in tandem with one another.

Figure 1:
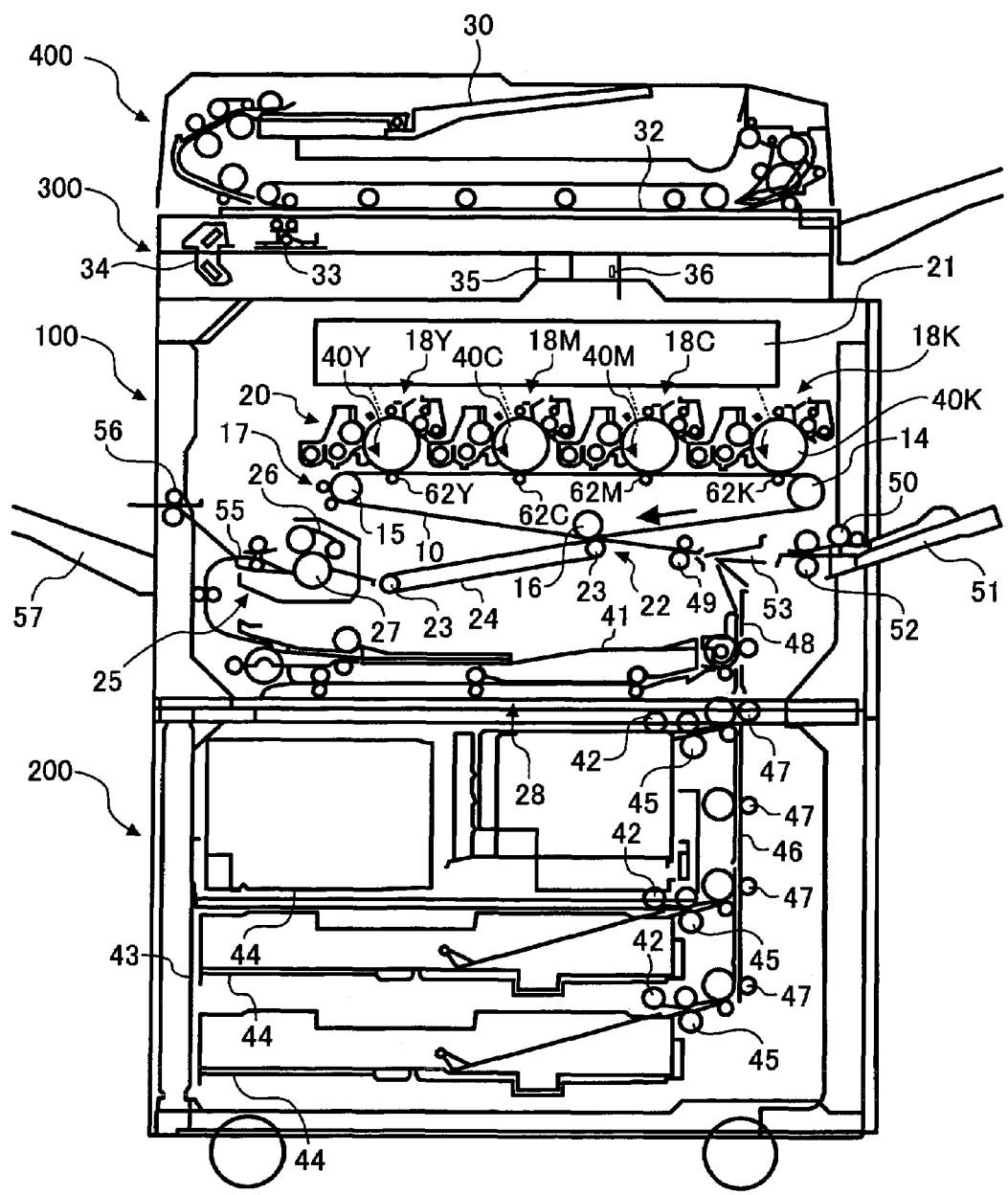
FIG. 1 is a schematic diagram of a copying machine according to an embodiment of the present invention.

FIG. 1 is a schematic illustration of the copying machine according to the embodiment. This copying machine includes a printer section 100, a paper feed device 200, and a scanner 300 fixed to the upper side of the printer section 100. The copying machine also includes an auto document feeder (ADF) 400 fixed to the upper side of the scanner 300.

The printer section 100 includes an image forming unit 20 consisting of four process cartridges 18Y, 18C, 18M, and 18K for forming images of colors of yellow (Y), magenta (M), cyan (C), and black (K). In addition to the process cartridges 18Y, 18C, 18M, and 18K, the printer section 100 also includes an optical write unit 21, an intermediate transfer unit 17, a secondary transfer device 22, a registration roller pair 49, a paper feed cassette 41, and a fixing unit 25 of a belt fixing system.

The optical write unit 21 has a light source (not shown), a polygon mirror, an fθ lens, and a reflection mirror, and radiates laser beams to the surface of a photosensitive element explained later based on image data.

Figure 2:
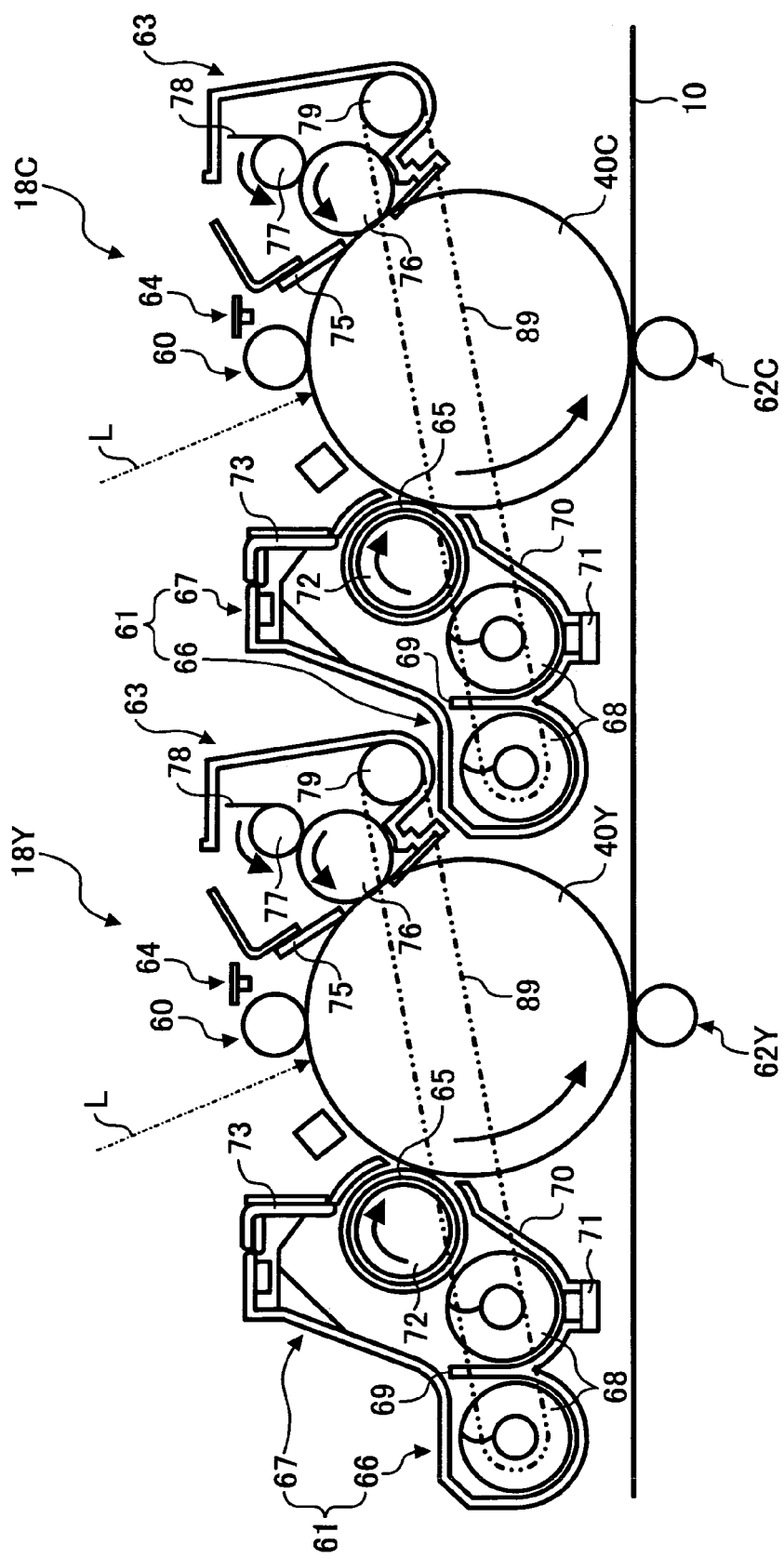
FIG. 2 is an enlarged view of process cartridges for Y and C of the copying machine.

FIG. 2 is an enlarged view of a schematic configuration of the process cartridge 18Y for yellow and the process cartridge 18C for cyan among the process cartridges 18Y, 18C, 18M, and 18K. The rest of the process cartridges have the same configuration as that of the above two cartridges except for toners of different colors, and therefore, explanation thereof is omitted. As shown in FIG. 2, the process cartridge 18Y as an imaging unit has a drum-like photosensitive element 40Y, a charger 60, a developing device 61, a drum cleaning device 63, and a decharger 64.

The charger 60 uniformly charges the surface of the drum by sliding a charging roller applied with an ac voltage along the photosensitive element 40Y. Any other member such as a charging brush may contact the photosensitive element instead of the charging roller. Further, instead of the contact charging type, a scorotron charger of a non-contact charging type may be used. A laser beam L that is modulated and polarized by the optical write unit 21 (see FIG. 1) is radiated to the surface of the photosensitive element 40Y that has bee changed. Then, an electrostatic latent image for Y is formed on the surface of the drum. The formed electrostatic latent image for Y is developed by the developing device 61 to form a toner image of Y ("Y toner image").

The photosensitive element 40Y as an image carrier is a drum type covered with a photosensitive layer made of an organic photosensitive material. Instead of the drum type, a belt type may be employed. The developing device 61 has a developing part 67 and a stirring part 66 in a casing 70. The developing part 67 includes a developing sleeve 65 that exposes a part of the circumferential surface from an opening of the casing 70, and a doctor blade 73.

The developing sleeve 65 of a cylindrical shape is made of a nonmagnetic material, and the surface thereof is subjected to sandblasting to obtain a ten-point average surface roughness up to about Rz 10 to 30 micrometers. The obtained surface roughness allows a developer conveying capability to be enhanced. Instead of the surface roughness, fine grooves may be made on the surface of the developing sleeve 65. The developing sleeve 65 is rotated by a drive unit (not shown). Inside of the rotated developing sleeve 65, a magnet roller 72 is fixed so as to prevent its rotation together with the sleeve. The magnet roller 72 has a plurality of poles that are branched in a circumferential direction of the roller 72. A plurality of magnetic fields is formed around the developing sleeve 65 due to influence of these poles.

The stirring part 66 of the developing device 61 includes two conveyor screws 68, and a toner density sensor (hereinafter, "T sensor") 71, and accommodates two-component developer (not shown) containing magnetic carrier and negatively charged Y toner. The two-component developer (hereinafter, "developer") is conveyed by the two conveyor screws 68 in a direction of the depth in the figure while being stirred, and is charged by friction. During stirred and conveyed, the developer contacts the surface of the developing sleeve 65 in its axial direction. The developer is then carried on the surface of the developing sleeve 65 due to influence of the magnetic field extended from the surface of the sleeve toward the inside of the stirring part 66. Then, the developer is sucked up from the stirring part 66 together with rotation of the surface of the sleeve. The developer is conveyed to a position facing the doctor blade 73 together with the rotation of the surface of the sleeve. The thickness of a layer of the developer is restricted when the developer passes through a space (about 500 μm) between the developing sleeve 65 and the doctor blade 73, and the frictional charging to the toner is fostered.

The developer having passed through the space reaches a developing region, which faces the photosensitive element 40Y, with rotation of the surface of the sleeve 65. In this developing region, the magnet roller 72 produces high magnetic force in the direction of the normal to the sleeve 65, which allows the developer to be formed as a magnetic brush. The formed magnetic brush moves while the tips of the brush are sliding along the photosensitive element 40Y and the Y toner is deposited on an electrostatic latent image for Y on the photosensitive element 40Y. Through the deposition, a Y toner image is formed thereon.

The developer in which the Y toner is consumed through development is returned to the developing device 61 together with the rotation of a developing sleeve 72 as a developer carrier. The developer is separated from the surface of the sleeve affected by the influence of a repulsive magnetic field formed in the developing device and the gravity, and is returned inside the stirring part 66 that is arranged at a lower position than that of he developing part 67.

The stirring part 66 has a partition wall 69 between the two conveyor screws 68. The partition wall 69 partitions the stirring part 66 into two parts. Of the two conveyor screws 68, a first conveyor screw 68 arranged on the right side of FIG. 2 is rotated by a drive unit (not shown), and supplies the developer to the developing sleeve 72 while conveying it toward the back from the front side of FIG. 2. The developer conveyed up to the end of the back is transferred to a second conveyor screw 68 on the left side of the figure passing through an opening (not shown) provided in the partition wall 69. The developer is conveyed this time from the back toward the front side of the figure by the rotation of the second conveyor screw 68, and is returned to the first conveyor screw 68 through another opening (not shown) provided in the partition wall 69. In such a manner, the developer is circulated in the stirring part 66.

The T sensor 71 as a magnetic permeability sensor is provided below the first conveyor screw 68, and outputs a voltage of a value corresponding to a magnetic permeability of the developer conveyed above the sensor. The magnetic permeability of the developer has a correlation with toner density to some extent, and therefore, the T sensor 71 outputs the voltage corresponding to the density degree of the Y toner. The value of the output voltage is transmitted to a controller (not shown). The controller includes a random access memory (RAM) that stores Vtref for Y as a target value of the output voltage from the T sensor 71.

The controller also stores data Vtref for M, Vtref for C, and Vtref for M as target values of output voltage from T sensors (not shown) mounted on other developing devices. The Vtref for Y is used to drive a Y toner supply device (not shown). More specifically, the controller controls the Y toner supply device to replenish the stirring part 66 of the developing device 61 with Y toner so that the value of the output voltage from the T sensor 71 for Y is close to the Vtref for Y. With the replenishment, the density of Y toner of the developer in the developing device 61 is maintained within a predetermined range. Likewise, toner replenishment is executed for developing devices of the other process cartridges.

The Y toner image formed on the photosensitive element 40Y for Y is transferred to an intermediate transfer belt 10 explained later. After the intermediate transfer of the image, the surface of the photosensitive element 40Y is cleaned by the drum cleaning device 63 so that toner remaining on the surface thereof is cleaned off. The drum cleaning device 63 includes a fur brush 76, a recovery roller 77, a scraper blade 78, a recovery screw 79, and a cleaning blade 75.

The fur brush 76 is a roller-like brush with a large number of raised fibers made of acrylic carbon planted on a core material. The fur brush 76 is rotated in a counterclockwise direction in the figure such that the surface of the brush is moved in a counter direction at a portion facing the photosensitive element 40Y. Therefore, the tips of the fibers (not shown) are sequentially slid along the photosensitive element 40Y. The recovery roller 77 undergoes cleaning bias having a positive polarity from a power source (not shown) while it is rotated in the counterclockwise direction such that the surface of the roller 77 is moved in a counter direction at a portion facing the brush so as to contact the fur brush 76.

Toner remaining on the photosensitive element 40Y after most toner is transferred is scraped off by the fibers of the fur brush 76 to be captured in the fur brush 76. The toner undergoes the influence of the cleaning bias to be electrostatically adhered to the surface of the recovery roller 77 and is recovered. The recovered residual toner is scraped by the scraper blade 78 that is in contact with the recovery roller 77 to drop on the recovery screw 79. The recovery screw 79 rotated by a drive unit (not shown) receives such residual toner and transferred to a toner recycle device 89.

Some of the residual toner that has not been captured by the fur brush 76 is scraped by the cleaning blade 75 disposed on the downstream side of the brush in the direction of rotating the drum, and is captured by the fur brush 76. The cleaning blade 75 is made of an elastic material such as polyurethane rubber.

In the process cartridge 18Y, the photosensitive element 40Y cleaned by the drum cleaning device 63 is decharged by the decharger 64, and then uniformly charged by the charger 60 to be returned to its initial state. The series of process is also applied to the other process cartridges (18C, 18M, and 18K).

Figure 3:
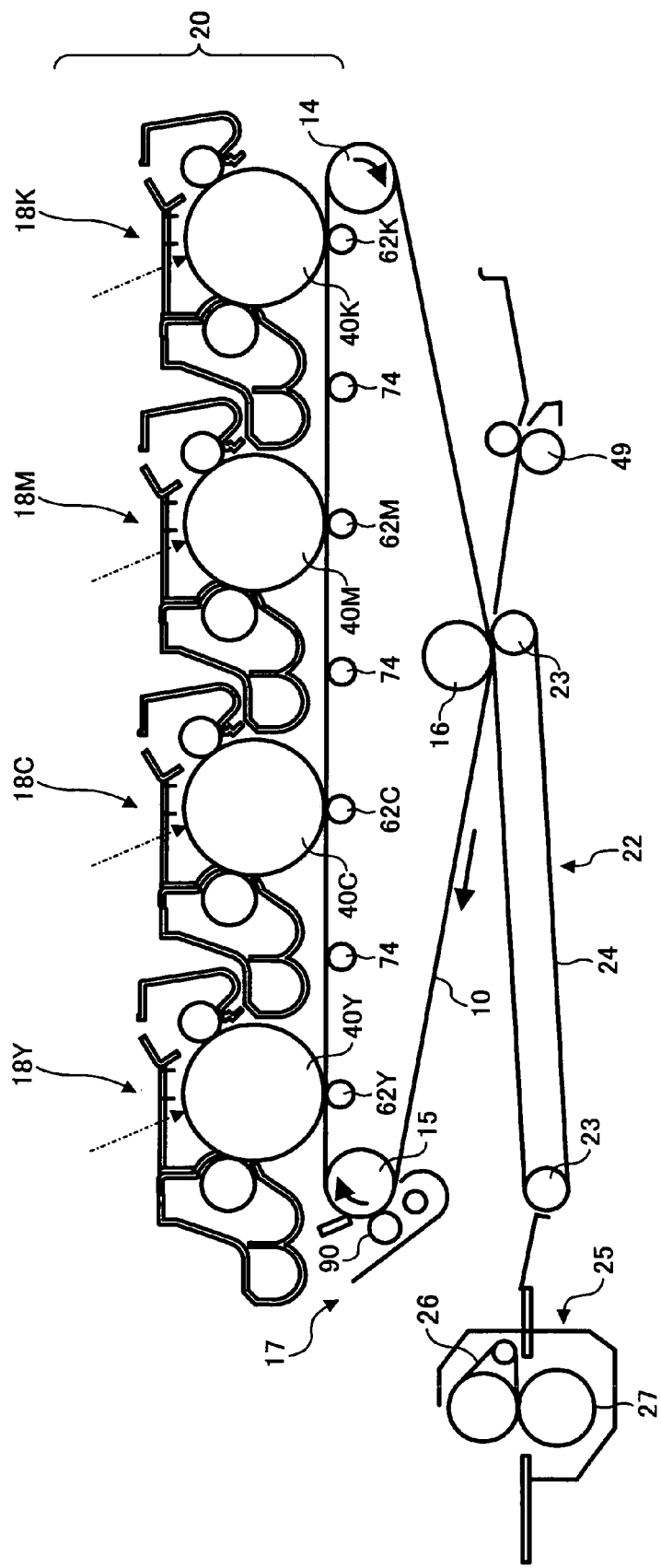
FIG. 3 is an enlarged view of an image forming unit, an intermediate transfer unit, a secondary transfer device, a registration roller pair, and a fixing unit of the copying machine.

FIG. 3 is an enlarged view of the image forming unit 20, intermediate transfer unit 17, secondary transfer device 22, registration roller pair 49, and the fixing unit 25. The intermediate transfer unit 17 includes the intermediate transfer belt 10 and a belt cleaning device 90. The intermediate transfer unit 17 also includes a stretching roller 14, a drive roller 15, a secondary transfer backup roller 16, four intermediate transfer bias rollers 62Y, 62C, 62M, and 62K, and three ground rollers 74.

Figure 4:
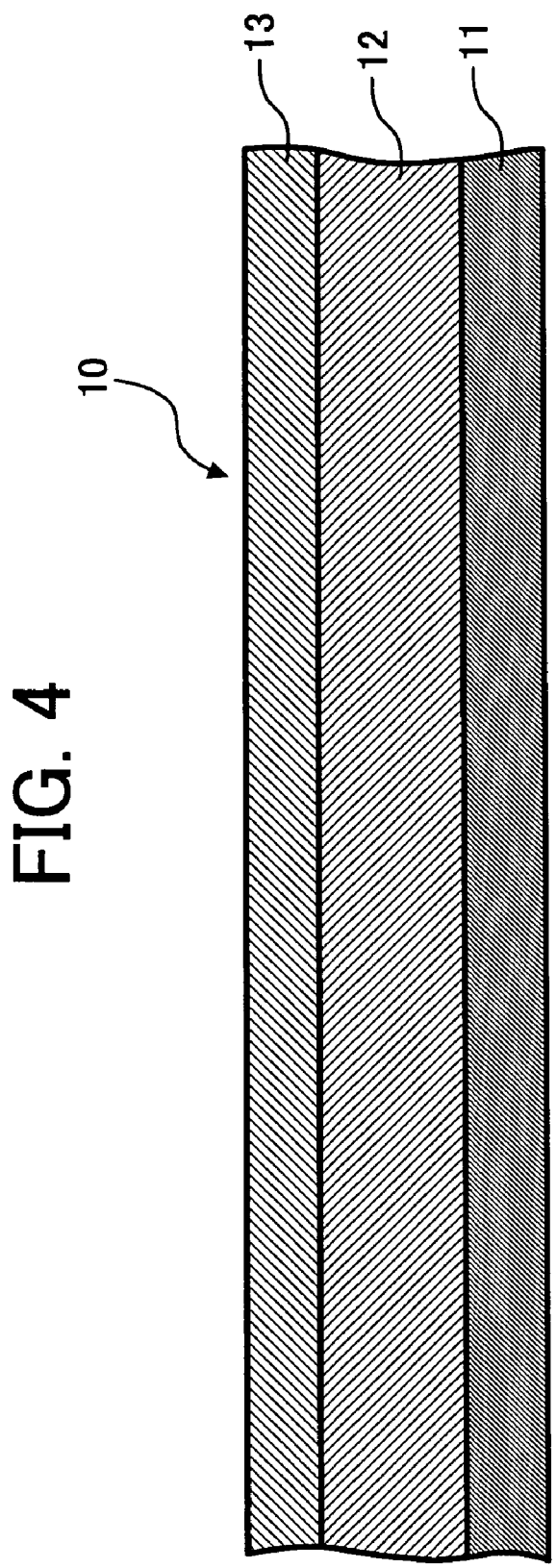
FIG. 4 is an enlarged view of the intermediate transfer unit.

The intermediate transfer belt 10 has a base layer 11, an elastic layer 12, and a surface layer 13 from the inside of a loop of the belt as shown in FIG. 4. The base layer 11 is made of fluororesin that is less elastic, or a layer including or layering a material such as canvas being less elastic in or on a rubber material being more elastic. The surface layer 13 is made of a material such as fluororesin that has low surface energy and has good releasability against toner.

The elastic layer 12 is made of an elastic material such as fluororubber and acrylonitrile-butadiene copolymer rubber, and is provided to deliver elasticity to some extent to the whole belt. The reason of providing the elastic layer 12 is as follows. That is, the intermediate transfer belt 10 has a single layer of a resin material in conventional technology. However, if the belt used to form a four-color toner image like the copying machine of the present invention has such a single layer, phenomena such as a hollow character and a lack of edge definition in a solid portion are easy to occur. The occurrence of these phenomena has to do with aggregation between toner particles.

More specifically, each color toner layer among the four-color toner image enters into a nip where the layer is repeatedly pressed during a period from a process of intermediate transfer for superposition to a process of collective secondary transfer. The aggregation of toner particles is enhanced each time the layer is pressed. Consequently, the aggregation of toner particles is considerably enhanced just before the secondary transfer, which makes it easy that the phenomena may occur. Therefore, the elastic layer 12 is provided to apply elasticity to the whole belt. Accordingly, it is possible to reduce aggregation of toner particles due to pressure at each nip and minimize occurrence of the phenomena.

In recent tendency, demand for outputting a full-color image on not only a normal paper but also a Japanese paper or a specific paper, such as a paper with rough surface on which irregularities are intentionally made, has been increased. However, the specific paper, whose surface is rough, does not allow the photosensitive element and the belt to be in close contact with each other at each nip, and therefore, defective transfer easily occurs. Since provision of the elastic layer 12 allows the surface of the belt to be flexibly deformed so as to fit the surface profile of the specific paper, it is also possible to minimize occurrence of defective transfer with respect to the specific paper by enhancing the close contact between the specific paper and the belt.

The intermediate transfer belt 10 is stretched by ten rollers including the stretching roller 14 as shown in FIG. 3. The belt 10 is endlessly moved in the clockwise direction in the figure by rotation of the drive roller 15 driven by a belt drive motor (not shown). The four intermediate transfer bias rollers 62Y, 62C, 62M, and 62K are arranged so as to contact the base layer (inner circumferential side) of the belt 10, respectively, and the rollers are applied with intermediate transfer bias from the power source (not shown).

The four intermediate transfer bias rollers 62Y, 62C, 62M, and 62K push the belt 10 against the photosensitive elements 40Y, 40C, 40M, and 40K from the side of the base layer to form each nip where intermediate transfer is performed (hereinafter, "intermediate transfer nip"). An intermediate transfer electrical field is produced in each of the intermediate transfer nips formed between the respective photosensitive elements and intermediate transfer bias rollers due to influence of the intermediate transfer bias. The Y toner image formed on the photosensitive element 40Y is transferred to the belt 10 by the electrical field and nip pressure. The C, M, and K toner images formed on the photosensitive elements 40C, 40M, and 40B are sequentially transferred to the Y toner image so as to be superposed on one another. Through the intermediate transfer for superposition, a four-color superposed toner image (hereinafter, "four-color toner image") as a multiple toner images are formed on the belt 10.

In the copying machine having such a configuration, an image superposing unit includes the optical write unit 21, the image forming unit 20, and the intermediate transfer bias rollers 62Y, 62C, 62M, and 62K.

The intermediate transfer belt 10 is contacted with the ground rollers 74 from the base layer side at respective positions between corresponding intermediate transfer nips. These ground rollers 74 are formed of a conductive material. This conductive material prevents an electric current due to intermediate transfer bias transmitted, at the respective intermediate transfer nips, from each of the intermediate transfer bias rollers 62Y, 62C, 62M, and 62K to the belt 10, from being leaked to the other intermediate transfer nips and process cartridges.

The four-color toner image obtained by being superposedly transferred to the intermediate transfer belt 10 is secondarily transferred to a transfer paper (not shown) at a secondary transfer nip explained later. Residual toner remaining on the surface of the belt 10 after passing through the secondary transfer nip is cleaned by the belt cleaning device 90 that holds the belt with the drive roller 15 on the left side of FIG. 3. As the belt cleaning device 90, the example of using both a fur brush method and a cleaning blade method like the drum cleaning device 63 is explained. However, any of the methods may be employed.

The secondary transfer device 22 is arranged below the intermediate transfer unit 17. The secondary transfer device 22 stretches a paper conveying belt 24 by two stretching rollers 23. The paper conveying belt 24 is endlessly moved in the counterclockwise direction in the figure with rotation of at least either of the stretching rollers 23. Of the two stretching rollers 23, a roller disposed on the right side of the figure holds the intermediate transfer belt 10 and the paper conveying belt 24 with the secondary transfer backup roller 16 of the intermediate transfer unit 17. The belts are held to allow the secondary transfer nip to be formed at a portion where the intermediate transfer belt 10 of the intermediate transfer unit 17 and the paper conveying belt 24 of the secondary transfer device 22 come in contact with each other. The stretching roller 23 is applied with the secondary transfer bias having a reverse polarity to that of toner. By applying the secondary transfer bias, an electric field for secondary transfer (hereinafter, "secondary-transfer electric field") is produced at the secondary transfer nip. This secondary-transfer electric field allows the four-color toner image on the intermediate transfer belt 10 to be electrostatically moved toward the other stretching roller 23 from the belt side. The four-color toner image influenced by the secondary-transfer electric field and the nip pressure is secondarily transferred to the transfer paper fed to the second transfer nip so as to synchronize the four-color toner image on the intermediate transfer belt 10 by the registration roller pair 49 explained later. It is noted that, instead of the secondary transfer system in which the secondary transfer bias is applied to one of the stretching roller 23, a charger that charges the transfer paper in a non-contact form may be provided.

The registration roller pair 49 is disposed on the upstream side of the secondary transfer nip in the moving direction of the belt. The transfer paper (not shown) fed from the paper feed device 200 explained later into the printer section 100 is held between the rollers of the registration roller pair 49. On the other hand, in the intermediate transfer unit 17, the four-color toner image formed on the intermediate transfer belt 10 approaches the secondary transfer nip with the endless movement of the belt. The registration roller pair 49 sends out the transfer paper held between the rollers at a timing at which the transfer paper comes into close contact with the four-color toner image at the secondary transfer nip. Accordingly, the four-color toner image on the intermediate transfer belt 10 is in close contact with the transfer paper at the secondary transfer nip. The toner image is secondarily transferred to a white transfer paper to obtain a full color image thereon. The transfer paper P, on which the full color image is formed in such a manner, leaves the secondary transfer nip with the endless movement of the paper conveying belt 24, and is sent from the paper conveying belt 24 to the fixing unit 25. It is noted that the registration roller pair 49 may be grounded or applied with bias to remove paper dust coming from the transfer paper. The bias is not DC bias but may be obtained by superposing the DC bias on AC bias.

The fixing unit 25 includes a belt unit having two rollers that stretch a fixing belt 26 and allowing the belt 26 to endlessly move, and a pushing roller 27 pushes itself against one of the two rollers. The fixing belt 26 and the pushing roller 27 are in mutually contact with each other and form a fixing nip. The transfer paper received from the paper conveying belt 24 is held into the nip. Of the two rollers in the belt unit, the roller pushed from the pushing roller 27 has a heat source (not shown), and heat generated thereby allows the fixing belt 26 to be pushed. The heated fixing belt 26 heats the transfer paper that is held in the fixing nip. By the heating and nip pressure, the full color image is fixed on the transfer paper.

As shown in FIG. 1, the transfer paper P having passed through the fixing unit 25 is discharged to the outside of the apparatus through a paper discharge roller pair 56. The discharged paper P is stacked in a stack portion 57, or is transmitted to a paper reversing unit disposed below the fixing unit 25. The paper P transmitted to the paper reversing unit is reversed herein and is conveyed again to the secondary transfer nip, and a four-color toner image is secondarily transferred to the other surface of the paper. The paper is then discharged to the outside through the fixing unit 25. The operation of whether the transfer paper P is to be transmitted to the fixing unit 25 or to the paper reversing unit is executed by switching between paper conveying paths using a switching claw 55.

When a document (not shown) is to be copied, a batch of sheet documents is placed on a document table 30 of the ADF 400. If the documents bound at one side like a book are to be copied, the ADF 400 is opened with respect to the body of the copying machine to expose a contact glass 32 of the scanner 300, and the documents are placed on the contact glass 32. Then, the ADF 400 is closed over the documents and the documents are pressed thereby.

The documents are placed in the above manner, and by pressing a copy start switch (not shown), the scanner 300 starts a document read operation. However, when the sheet documents are placed on the ADF 400, the ADF 400 automatically feeds them one by one to the contact glass 32 before starting the operation. In the operation, at first, both a first running body 33 and a second running body 34 start running, and light is emitted from a light source disposed in the first running body 33. The light is reflected from the surface of the document, and the reflected light is reflected by a mirror disposed in the second running body 34 to pass through an image forming lens 35, and the light enters into a reading sensor 36. The reading sensor 36 creates image information based on the incident light.

Simultaneously with performing such an image read operation, devices of the process cartridges 18Y, 18C, 18M, and 18K, the intermediate transfer unit 17, the secondary transfer device 22, and the fixing device 26 start their operations. The optical write unit 21 is driven based on the created image information to form toner images for Y, C, M, and K on the photosensitive elements 40Y, 40C, 40M, and 40B, respectively. These toner images are superposedly transferred to the intermediate transfer belt 10 to obtain a four-color toner image.

At substantially the same time as starting of the document read operation, a paper feed operation is started in the paper feed device 200. In the paper feed operation, one of the paper feed rollers 42 is selectively rotated, and a transfer paper is sent out from one of paper feed cassettes 44 that are accommodated in multiple stage in a paper bank 43. The sent-out transfer paper is separated one by one by a separation roller 45 to enter into a paper feed path 46, and is fed to a paper feed path 48 in the printer section 100. Instead of feeding the paper from the paper feed cassette 44, the paper is sometimes fed from a manual feed tray 51.

In this case, a paper feed roller 50 is selectively rotated to send out a transfer paper on the manual feed tray 51, and a separation roller 52 separates the transfer paper one by one to feed it to a manual paper feed path 53 of the printer section 100. The transfer paper fed to the paper feed path 48 or the manual paper feed path 53 passes through the registration roller pair 49 and the secondary transfer nip. Then, a four-color toner image is secondarily transferred to the transfer paper. The paper is discharged to the outside of the apparatus after passing through the fixing unit 25.

Figure 16:
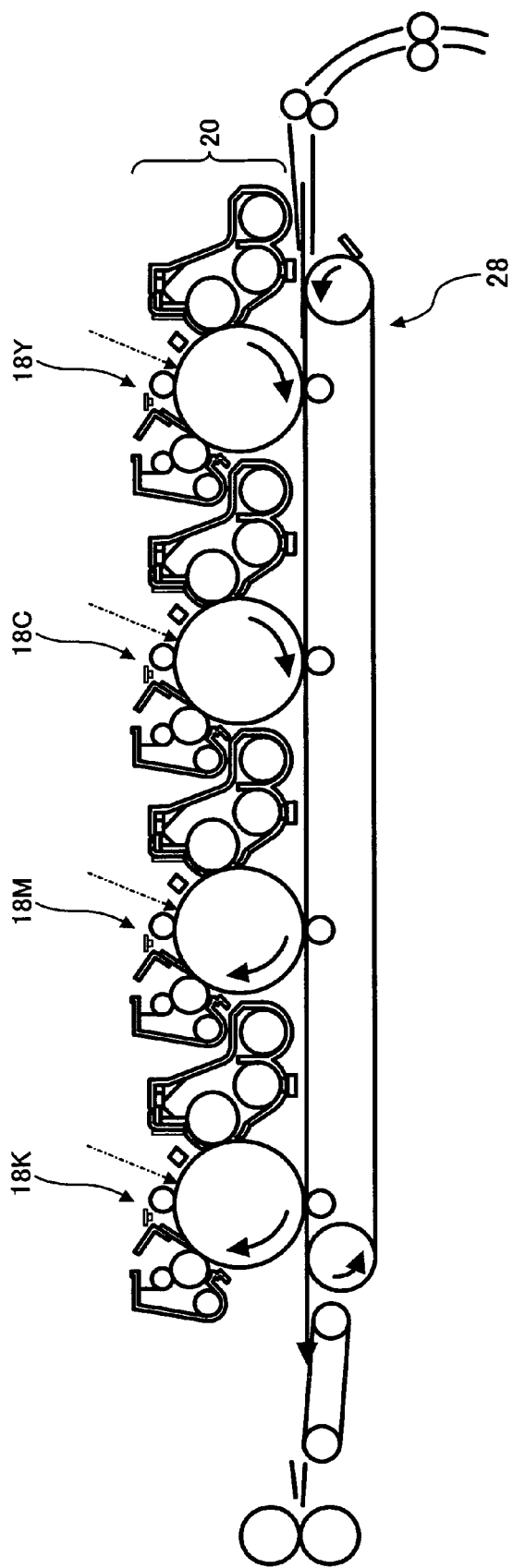
FIG. 16 is a schematic diagram of a tandem image forming apparatus of an indirect transfer type.

When a color image is formed in the tandem type electrophotographic method, it is desirable to employ an indirect transfer method rather than the direct transfer method. More specifically, the tandem type electrophotographic method includes one in which direct transfer is performed to a recording material such as a transfer paper and one in which indirect transfer is performed thereto. The tandem type of the direct transfer method is as follows as shown in FIG. 16. That is, a paper conveying unit 28 is provided in a position the faces the image forming unit 20 including the process cartridges 18Y, 18C, 18M, and 18K. The tandem type of the method is a method such that color toner images are directly and superposedly transferred to a recording material such as a transfer paper that is conveyed by the paper conveying unit 28. In this method, a fixing unit and a paper feed unit that feeds a paper to the paper conveying unit 28 have to be provided on both sides of the image forming unit 20 as shown in the figure if a recording material conveying path is linearly structured. This causes a planar area of the main body to be disadvantageously increased.

If the fixing unit is disposed close to the paper conveying unit 28 so as not to upsize the apparatus as much as possible, a space that makes the recording material flexible between the two units cannot be ensured. Therefore, a defective image may occur due to a difference in conveying speed between the two. On the other hand, the tandem type of the indirect transfer method is, like the copying machine according to the embodiment, a method of superposedly transferring the single-color toner images to the intermediate transfer body to obtain a multi-color toner image and collectively transferring the image to the recording material. In this method, by interposing the intermediate transfer body between the image forming unit 20 and the secondary transfer device 22, the paper feed unit and the fixing unit are disposed in the vertical direction with respect to the image forming unit 20, and therefore, it is possible to suppress an increase in the planar area.

Figure 5:
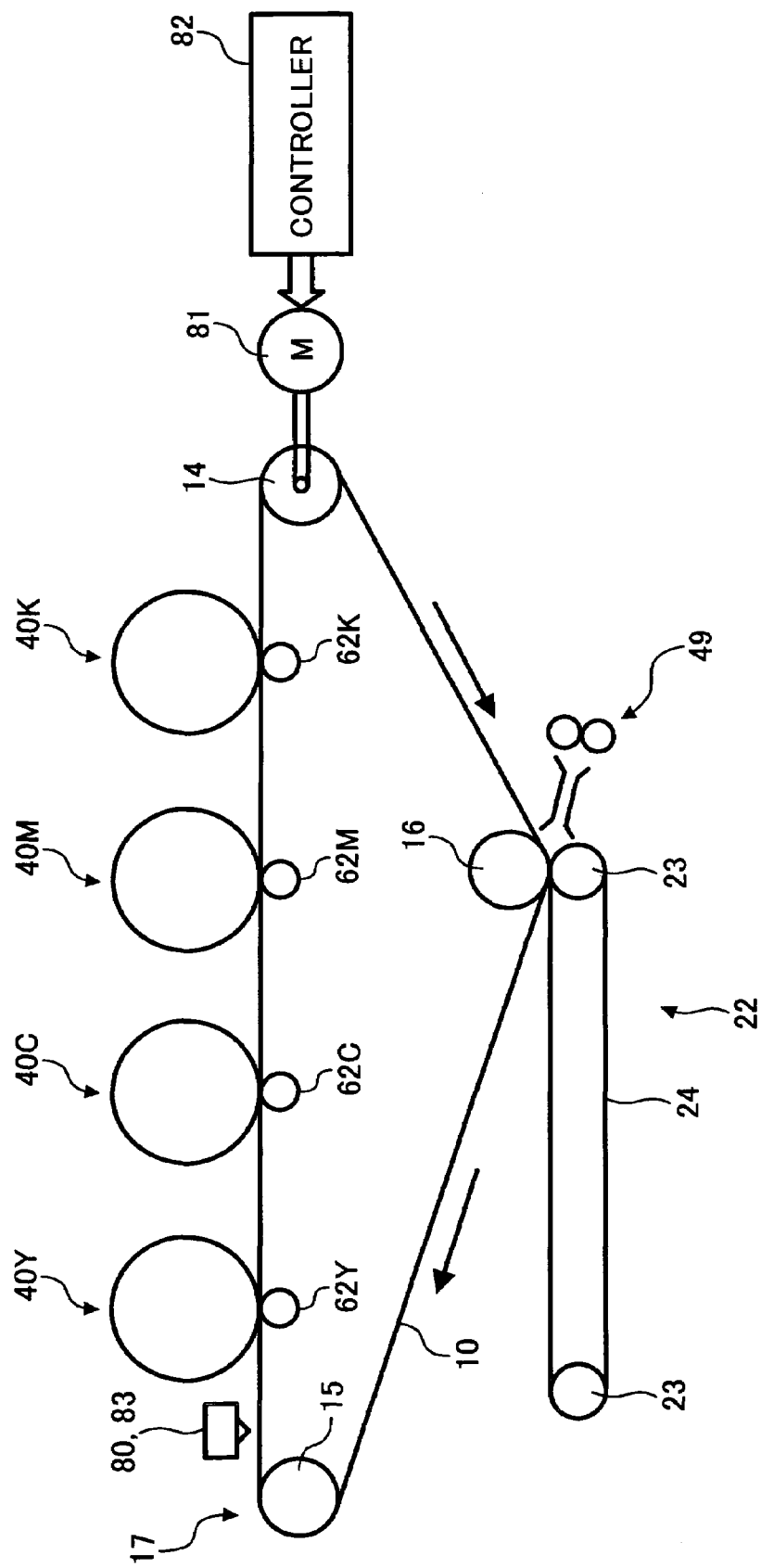
FIG. 5 is a schematic diagram of the intermediate transfer unit and periphery thereof.

FIG. 5 is an illustration of the key configuration of the intermediate transfer unit 17 and the periphery thereof. A scale detecting sensor 80 is disposed on the left side of the photosensitive element 40Y in the figure. The scale detecting sensor 80 detects scale marks in a scale seal, explained later, provided on the surface of the intermediate transfer belt 10.

The stretching roller 14 that endlessly moves the intermediate transfer belt 10 is connected with a belt drive motor 81 through a drive transmission line including a gear (not shown). The belt drive motor 81 rotates the stretching roller 14 through the drive transmission line to thereby endlessly move the intermediate transfer belt 10 stretched by the stretching roller 14. In such a configuration, a controller 82 that controls the belt drive motor 81 serves as a belt drive controller that controls the drive of the intermediate transfer belt 10.

Figure 6:
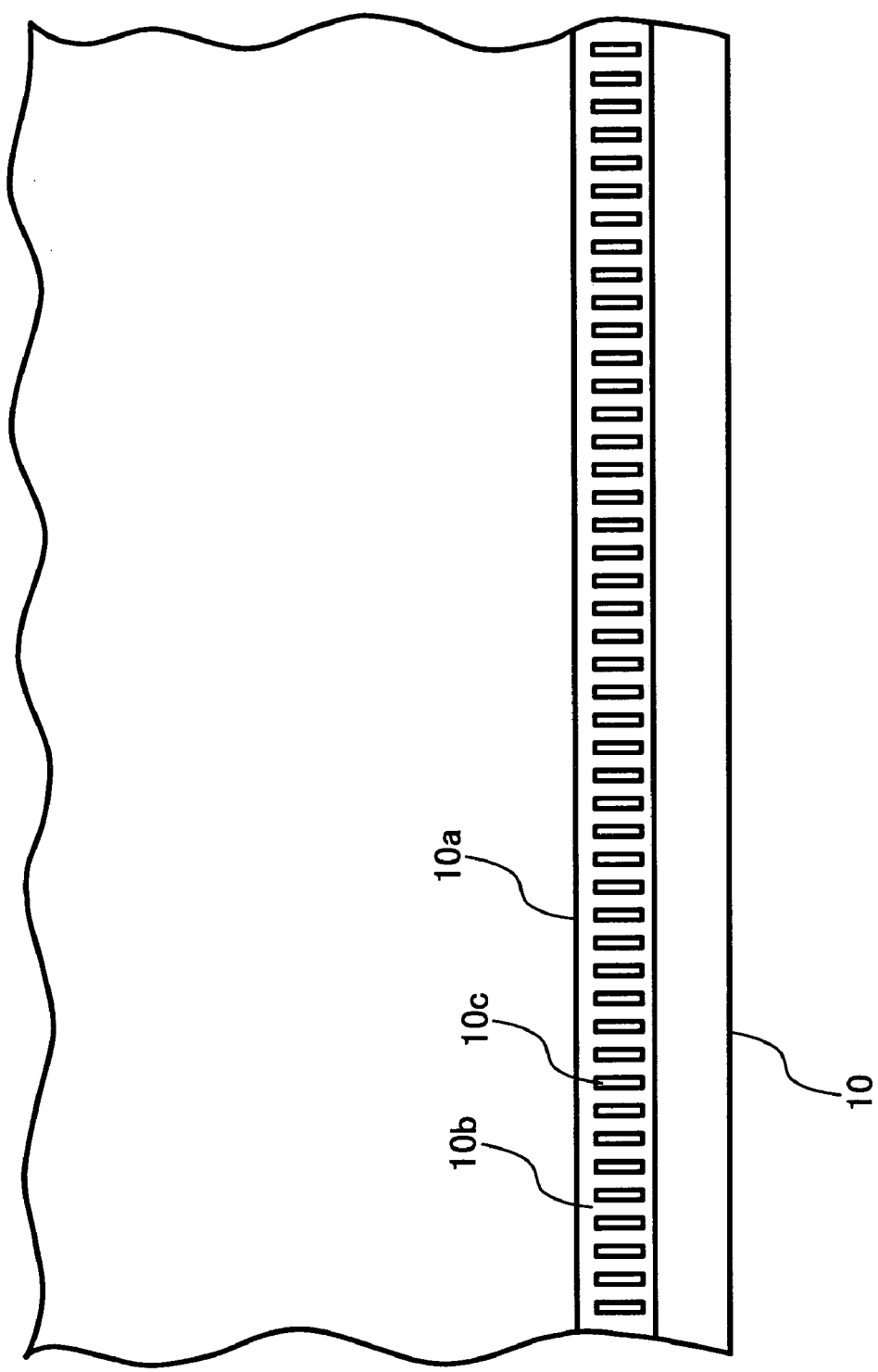
FIG. 6 is an enlarged view of an edge of the intermediate transfer belt.

FIG. 6 is an enlarged plan view of an edge of the intermediate transfer belt 10. A scale seal 10a is adhered to near one edge of the belt 10 (in the vicinity of the edge on the front side of FIG. 5) over the circumference of the surface of the belt. An area of the belt 10 to which the seal is adhered is a non-image area in the lateral direction of the belt 10. Toner images of respective colors are transferred to a place closer to the center of the belt than this area. A low reflectivity part 10b as a background of the surface of the seal is formed on the scale seal 10a. A plurality of high reflectivity parts 10c is provided each in a slit form. The high reflectivity parts 10c are equally spaced at a predetermined pitch. When the belt 10 is endlessly moved, the low reflectivity part 10b and the high reflectivity parts 10c are alternately detected by the scale detecting sensor 80.

In the copying machine according to the present invention, the intermediate transfer belt 10 has a length such that the operations of intermediate transfer for superposition and collective secondary transfer are complete with a movement by less than one round in an endless manner, during a period from the start of driving the belt to the end of the driving. Therefore, the output of a full color image to a sheet of transfer paper can be finished before the belt 10 is moved by one round or more.

Figure 7:
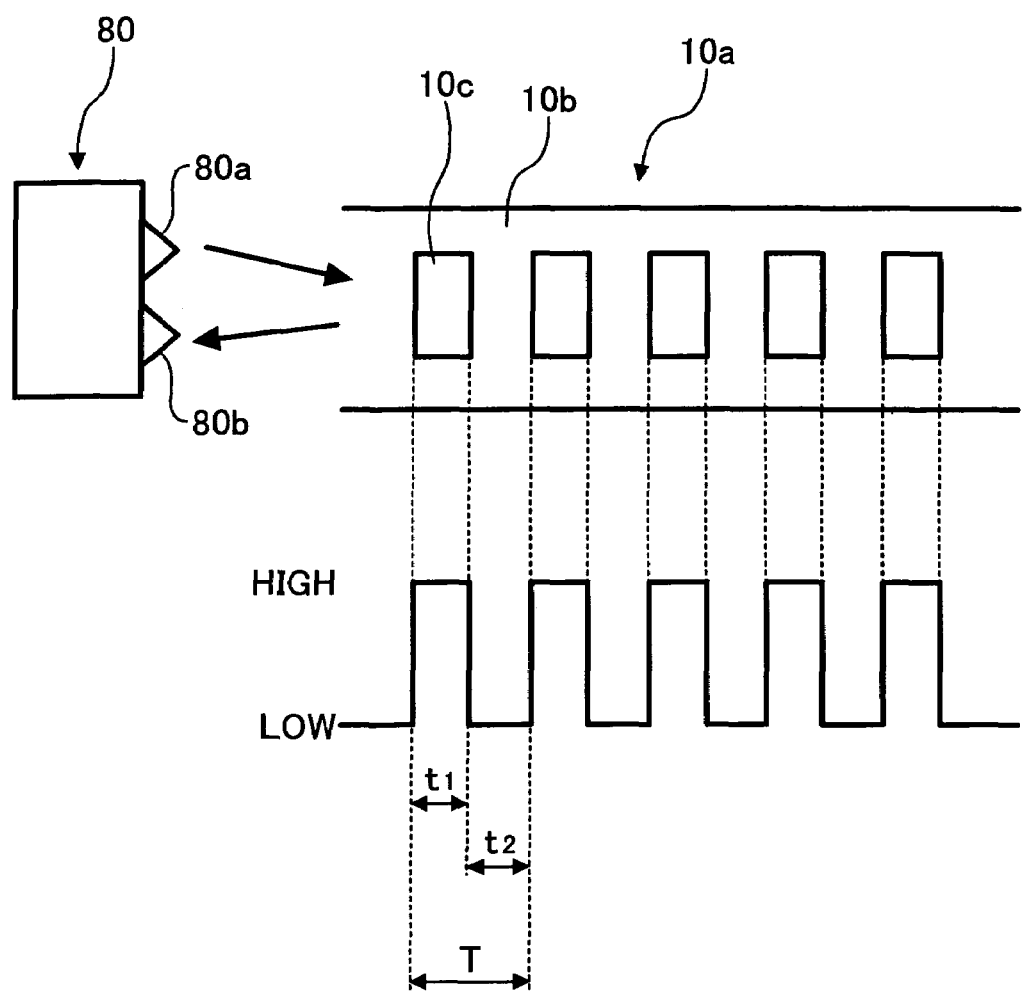
FIG. 7 is a schematic diagram of a relation between an output voltage of a scale detecting sensor and a scale seal.

FIG. 7 is a schematic diagram of a relation between an output voltage of the scale detecting sensor 80 and the scale seal 10a. The scale detecting sensor 80 is formed of a reflective type photosensor including a light emitting element 80a and a light receiving element 80b. The light emitted from the light emitting element 80a is reflected by the surface of the scale seal 10a to be received by the light receiving element 80b. The scale detecting sensor 80 outputs a voltage of a value corresponding to a quantity of light received by the light receiving element 80b to the motor driver as the controller 82 in FIG. 5.

When the intermediate transfer belt is endlessly moved at a speed equivalent to a designed reference speed, the scale pitch detected by the scale detecting sensor 80 becomes T second. More specifically, the scale detecting sensor 80 repeats changes in output such that a high voltage is output for t1 second based on the light reflected by the high reflectivity parts 10c as a scale mark and a low voltage is output for t2 second based on the light reflected by the low reflectivity part 10b. Consequently, an interval between rising edges of high voltage pulses is the detected scale pitch, i.e., "t1+t2=T [sec]", in this embodiment.

The detected scale pitch is a time interval when the high reflectivity parts 10c are considered as the scale mark, but it is the same value when the low reflectivity part 10b is considered as the scale mark. More specifically, a low voltage is output for t2 second based on the low reflectivity part 10b as the scale mark, a high voltage is output for t1 second based on the high reflectivity parts 10c, and an interval between trailing edges of low voltage pulses becomes T second. Therefore, the scale pitch detected by the scale detecting sensor 80 becomes T second if the intermediate transfer belt (not shown) is endlessly moved at a speed equivalent to the designed reference speed.

If the endless movement speed of the intermediate transfer belt (hereinafter, "belt speed") is changed caused by a deviation in a thickness of the belt, the detected scale pitch is changed from T second. If it is longer than T second, the belt speed becomes slower than the designed reference speed. Further, if it is shorter than T second, the belt speed is faster than the designed reference speed.

Figure 8:
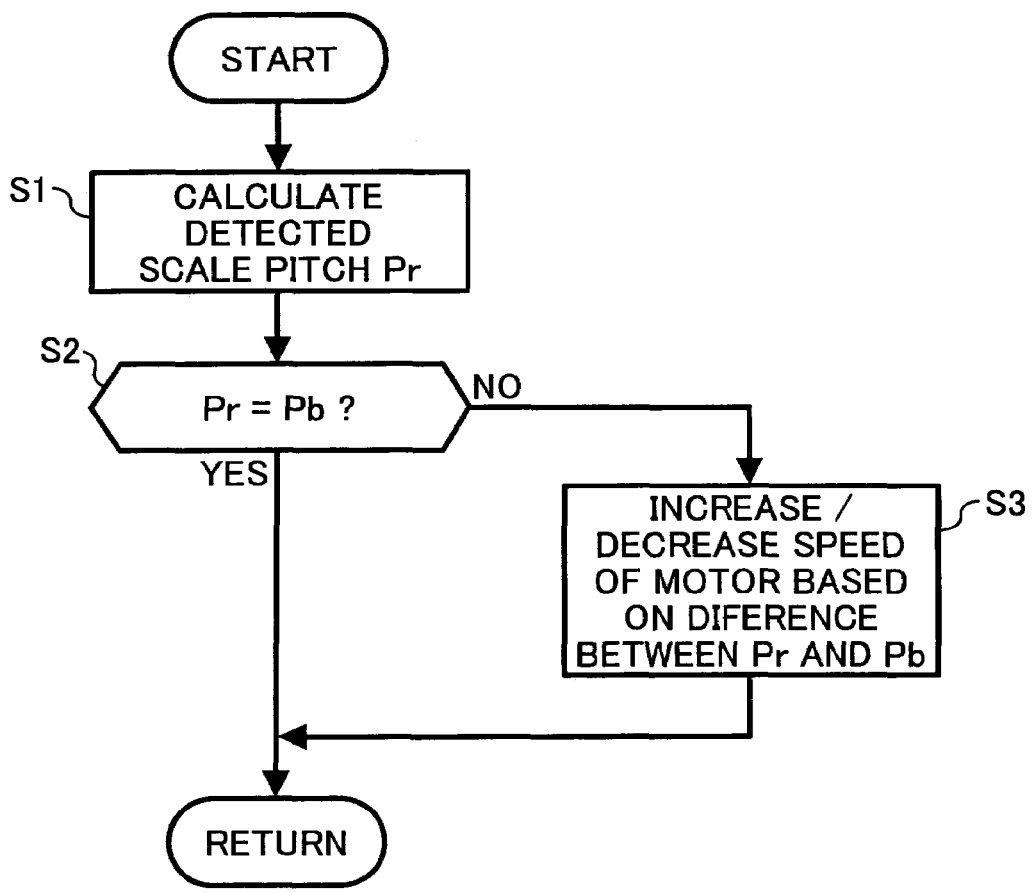
FIG. 8 is a flowchart of feedback control for driving the belt executed by a controller of the copying machine.

FIG. 8 is a flowchart of feedback control for driving the belt executed by the controller 82 as shown in FIG. 5. As for the control, the detected scale pitch Pr is first calculated based on the output voltage from the scale detecting sensor 80 as shown in FIG. 7 (S1). This calculation is executed by counting intervals between the rising edges of the high voltage pulses or between the trailing edges of the low voltage pulses. The calculated detected scale pitch Pr is determined whether the pitch Pr is the same as a pitch reference value Pb (T seconds in this embodiment) (S2).

If the pitch Pr is the same as the value Pb (Yes at S2), then the belt speed is not changed. Therefore, the control flow is returned to obtain the next detected scale pitch Pr. On the other hand, if it is not the same as the value Pb (No at S2), then the belt speed is changed. Therefore, the rotational speed of the belt drive motor 81 is increased or decreased in a proportion corresponding to a solution to "Pr−Pb" to return the belt speed to the designed reference speed (S3). In this manner, the result of comparison between the detected scale pitch Pr and the pitch reference value Pb is fed back to the drive control of the belt drive motor 81 to suppress the change in belt speed.

If the solution to "Pr−Pb" is a positive value, then the rotational speed of the belt drive motor 81 is controlled in a proportion corresponding to the positive value, and the belt speed is increased to the designed reference speed. If the solution to "Pr−Pb" is a negative value, then the rotational speed thereof is controlled in a proportion corresponding to the negative value, and the belt speed is decreased to the designed reference speed. The controller 82 that executes such feedback control plays the role as the belt drive controller that controls the driving of the belt member based on the result of detection by the scale detecting sensor 80 as a scale mark detector. By suppressing the change in belt speed, it is possible to suppress misalignment of the toner images of respective colors caused thereby.

However, a deviation in the circumference of the intermediate transfer belt (not shown) causes abnormality to occur in the scale pitch. For example, if the circumference of the belt is longer than the reference, the front end "s" as a start point of the scale seal 10a in the circumferential direction of the belt is not properly joined to a rear end "e" as an end point thereof. Therefore, a gap occurs between the front end s and the rear end e, which causes a gap between the high reflectivity part 10c positioned at the frontmost end "s" and the high reflectivity part 10c positioned at the rearmost end "e" of the scale seal 10a to become larger than the reference. Consequently, each timing of occurrence of the rising edge of the high voltage pulse and the trailing edge of the low voltage pulse is delayed by the length of the gap.

As a result, the detected scale pitch Pr is supposed to correspond to a total (L3) of a length L1 and a length L2, but an actually detected pitch is longer than the pitch Pr by the gap. Specifically, the length L1 represents the high reflectivity part 10c in the circumferential direction of the belt and the length L2 represents the low reflectivity part 10b adjacent thereto. Therefore, the gap between the high reflectivity part 10c positioned at the frontmost end s and the high reflectivity part 10c positioned at the rearmost end e becomes an abnormal part in the scale pitch that causes the detected scale pitch Pr to be changed although the belt speed is not changed at all.

Figure 9:
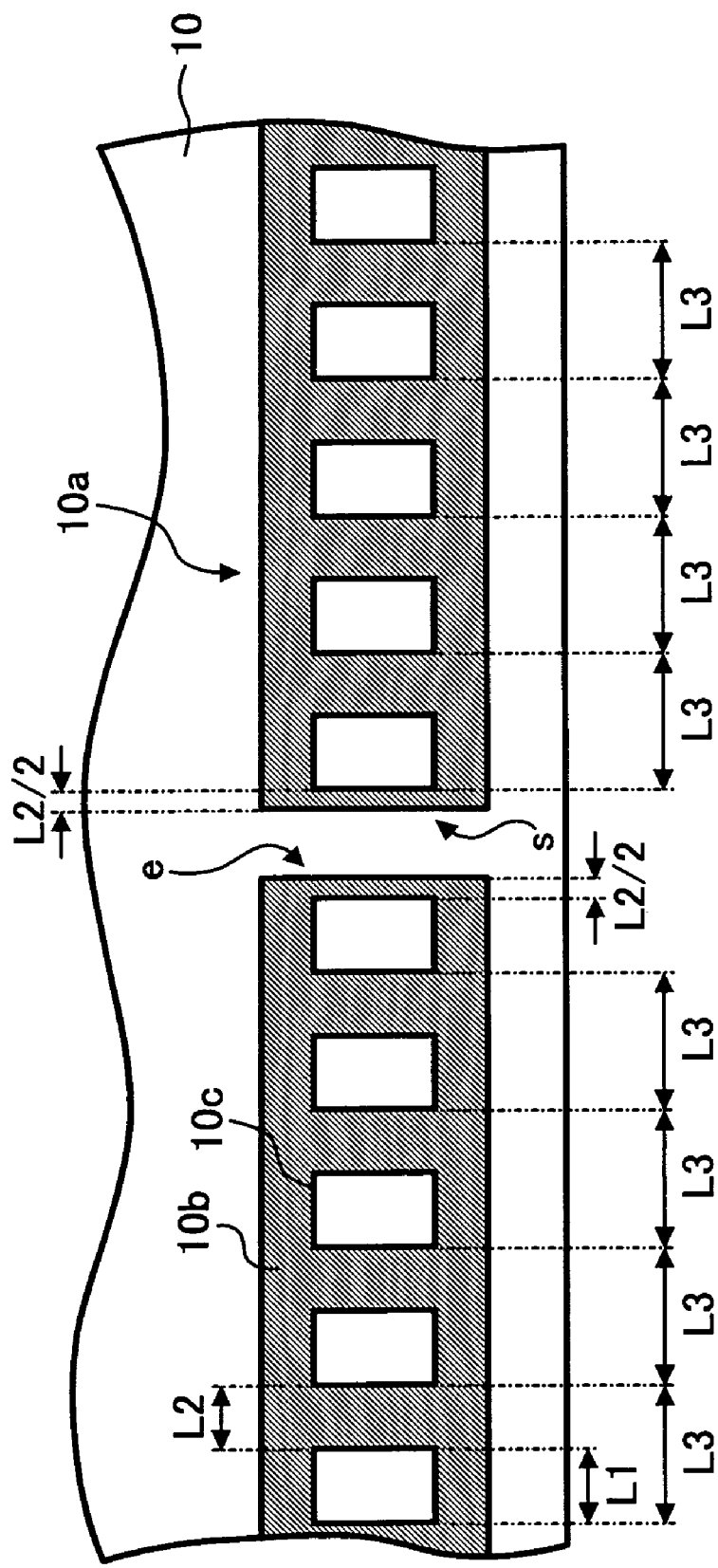
FIG. 9 is an enlarged view of the intermediate transfer belt having a gap that occurs at a joint between the front end and the rear end of the scale seal.

The abnormal part in the scale pitch of the scale seal 10a causes the controller 82 to misrecognize as if the belt speed decreases, and the misrecognition is reflected to the feedback control. Consequently, the controller 82 makes the belt speed faster than the reference to foster the change in the speed. The example in which the circumference of the belt is longer than the reference is explained by referring to FIG. 9, but if the circumference of the belt is shorter than the reference, the front end s and the rear end e of the scale seal 10a overlap each other where abnormality occurs in the scale pitch. Such abnormality causes the controller 82 to misrecognize as if the belt speed increases, and the misrecognition fosters the change in the belt speed as well.

Figure 10:
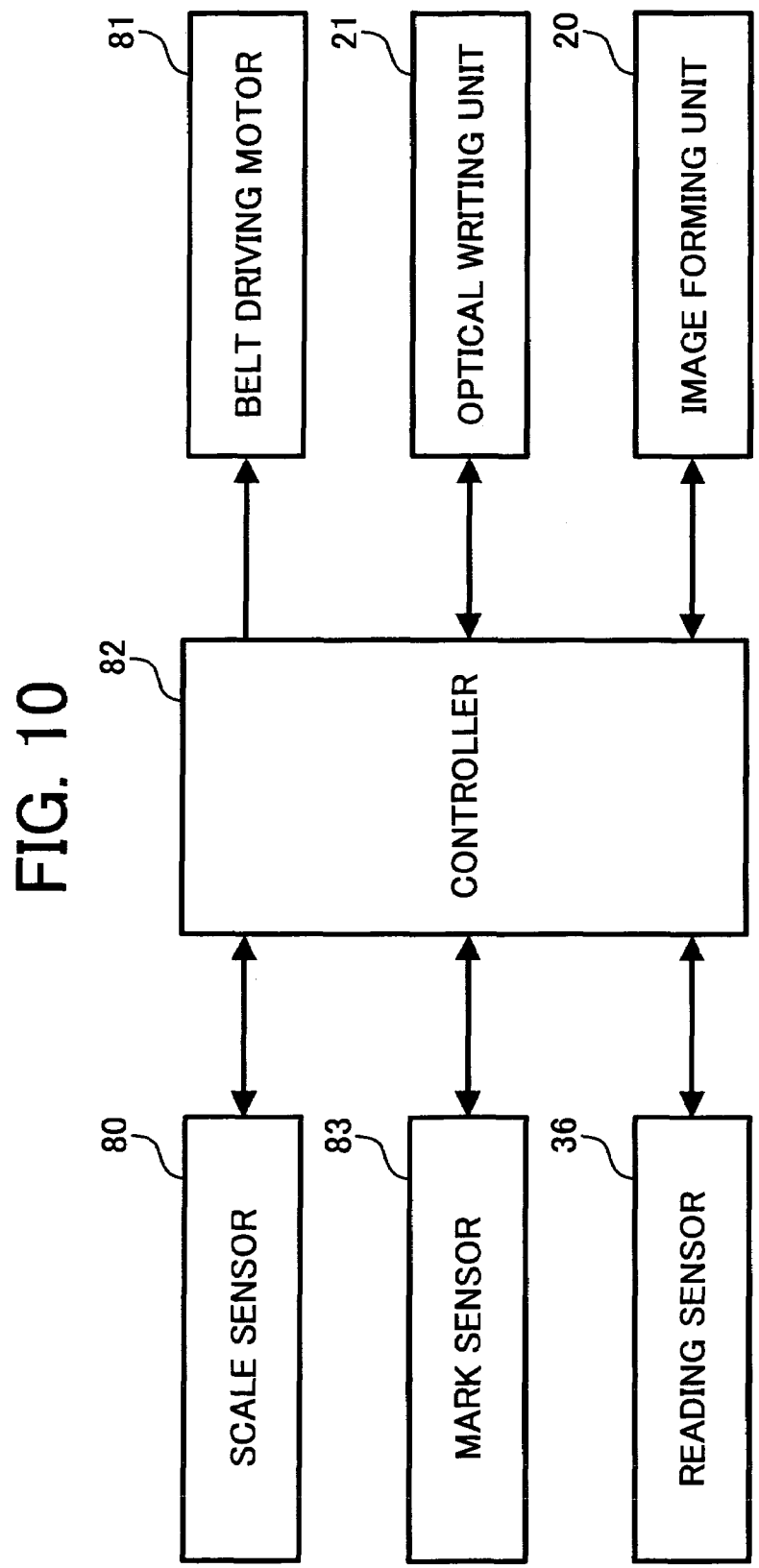
FIG. 10 is a block diagram of a part of an electric circuit of the copying machine.

FIG. 10 is a block diagram of a part of an electric circuit of the copying machine. The controller 82 includes a data storage unit such as RAM (not shown), and is connected with the scale detecting sensor 80 and the belt drive motor 81 so as to allow the feedback control. The controller 82 is also connected with a mark detecting sensor 83 explained later.

Furthermore, the controller 82 is connected with the optical write unit 21 and the image forming unit 20 so as to allow formation of a four-color toner image by the optical writing based on a result of reading an image by the reading sensor 36 of the scanner, development, and intermediate transfer for superposition. Therefore, the controller 82 plays the role as the belt drive controller and also the role as a superposition controller that controls superposition of the images on each other performed by the optical write unit 21 and the image forming unit 20. It is noted that the belt drive controller and the superposition controller may be discretely provided.

Figure 11:
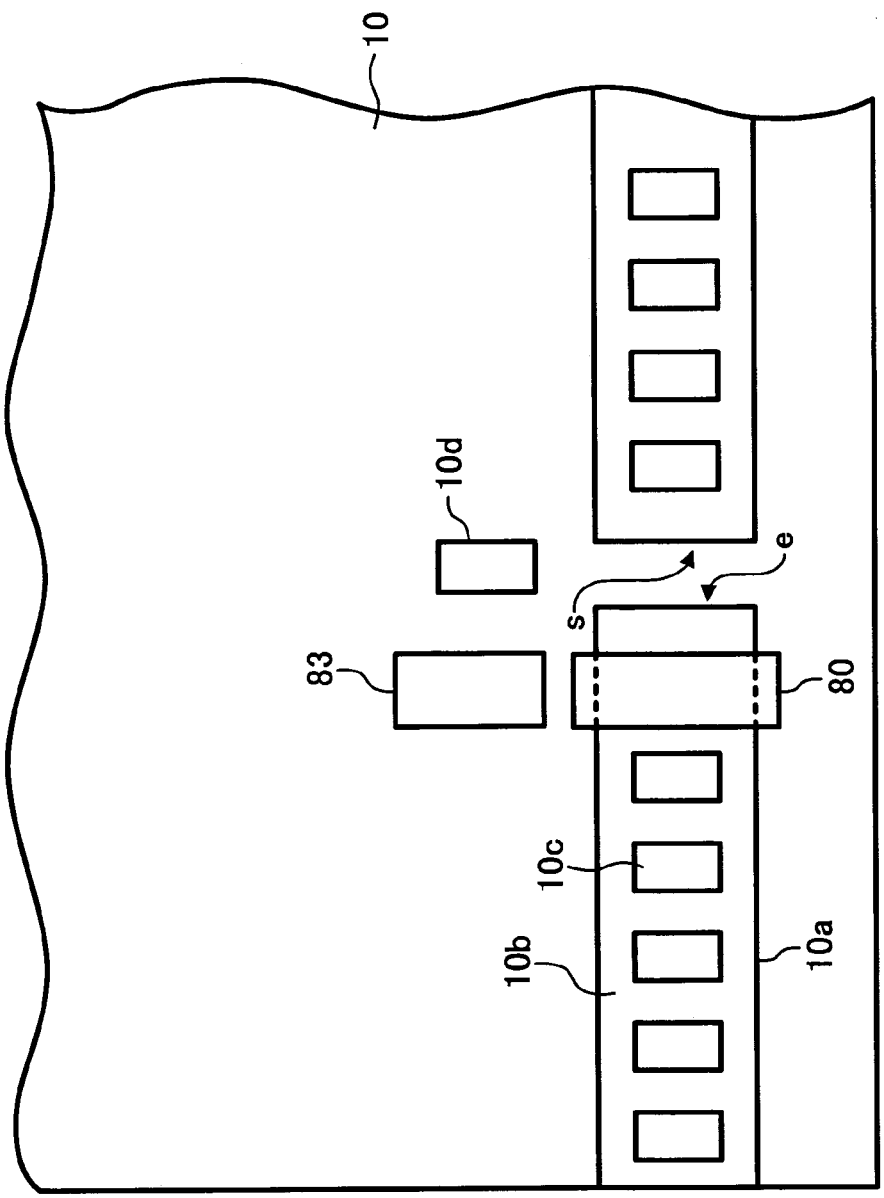
FIG. 11 is an enlarged view of a part of the intermediate transfer unit.

FIG. 11 is an enlarged plan view of a part of the intermediate transfer unit 17. The enlarge part includes the belt stretched portion by the drive roller 15 as shown in FIG. 5 and a unit portion around the belt stretched portion. As shown in FIG. 11, the belt portion on the left side of the figure is stretched by a stretching roller (not shown), and is moved from the left end to the right side of the figure. During the movement, the belt portion is let to pass through a position that faces the scale detecting sensor 80 before it enters into the intermediate transfer nip for Y (not shown). Accordingly, the scale marks (including low reflectivity part 10b and high reflectivity parts 10c) in the scale seal 10a are detected by the scale detecting sensor 80.

A gap is produced between the front end s and the rear end e of the scale seal 10a on the surface of the intermediate transfer belt 10 due to a deviation in the circumference of the belt. In this embodiment, a reference mark 10d is provided at the position where this gap exists. Here, the reference mark 10d is provided at a location closer to the center in the lateral direction of the belt off the scale seal 10a. The reference mark 10d has a higher reflectivity or a lower reflectivity than that of the solid surface of the belt. Furthermore, the mark detecting sensor 83 as a reference mark detector is provided next to the scale detecting sensor 80 in the lateral direction of the belt.

The mark detecting sensor 83 is also a reflective type photosensor, and detects whether the reference mark 10d has passed through a position detected by the sensor (hereinafter, "detection position") based on a change in light reflectivity of the reference mark 10d that passes through the detection position. An area where the reference mark is formed is also a non-image area, and therefore each toner image of respective colors is transferred to the central part of the belt off the reference mark 10d.

Figure 12:
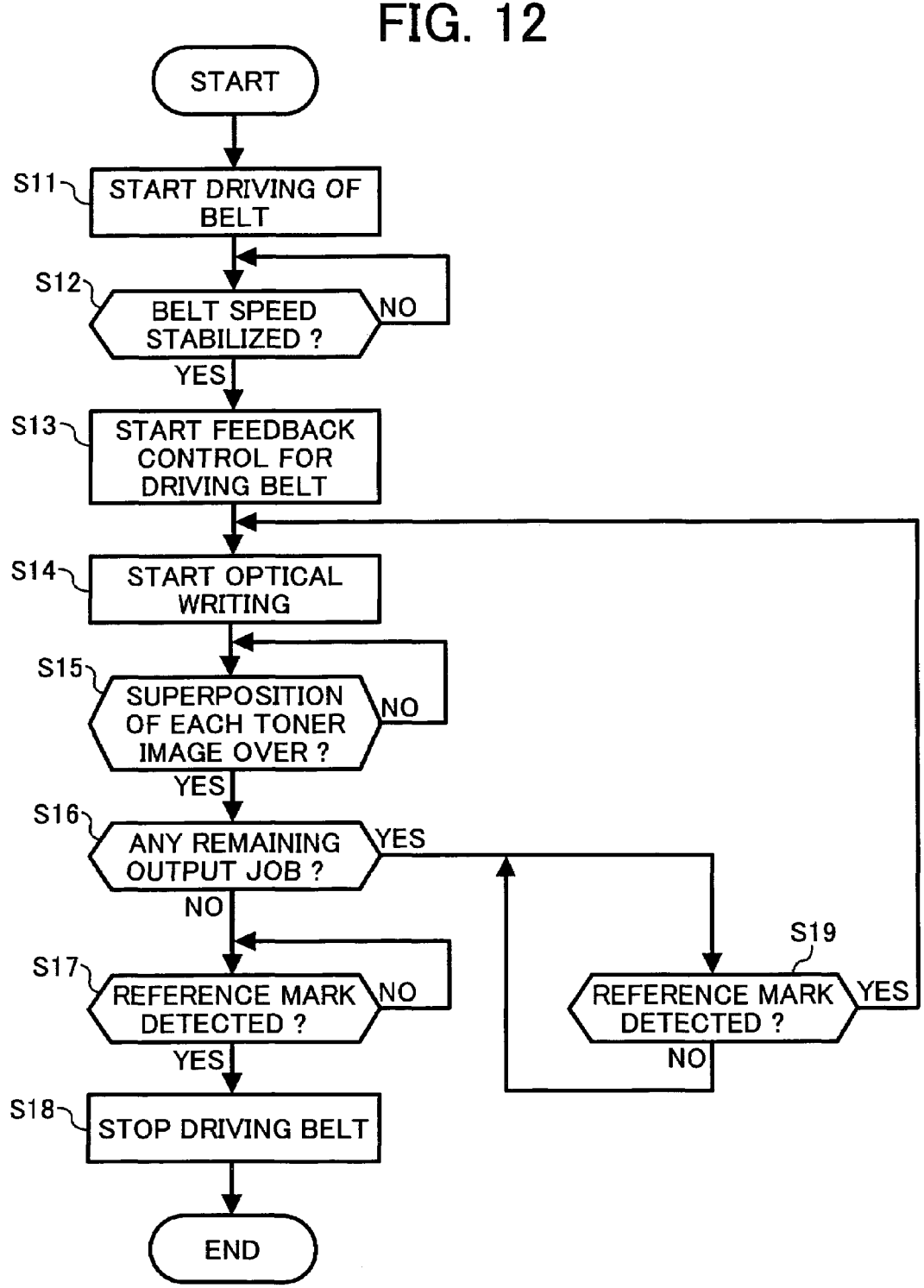
FIG. 12 is a flowchart of a part of process control executed by the controller.

FIG. 12 is a flowchart of drive control of the belt member executed by the controller 82. The controller 82 starts driving of the belt upon reception of an instruction of copy start from an operator (S11). The controller 82 determines whether the belt speed is stabilized (S12). If the belt speed is stabilized (Yes at S12), then feedback control is performed by using a result of detection by the scale detecting sensor 80 as shown in FIG. 8.

In other words, the speed control based on the result of detection by the scale detecting sensor 80 is not performed before the belt speed is stabilized. This is because the feedback control cannot immediately be performed since the belt speed is not increased up to the designed reference speed right after the belt is started to be driven. Therefore, the processing of speed control waits until the belt speed is stabilized when the belt is started to be driven.

Stabilization is determined by detecting the rising edge or the trailing edge for predetermined times from right after the belt is started to be driven. Alternatively, it is determined after a predetermined time is elapsed. When the belt speed is stabilized (Yes at S12), the feedback control is started (S13). The controller 82 controls the optical write unit 21 so as to start optical writing (S14), and waits until the operation of superposedly transferring the toner images of colors is finished (S15).

When the transfer is finished (Yes at S15), the controller 82 determines whether any output job still remains (S16). If one sheet of copy or print-out (hereinafter, "one-sheet output") is instructed, then there is no remaining output job (Yes at S16). In this case, the controller 82 controls so as to stop the belt immediately after the reference mark 10d is detected by the mark detecting sensor 83, and then a series of control flow ends (S17, S18).

The intermediate transfer belt 10 stops the endless movement in a state in which the reference mark 10d is almost detected by the mark detecting sensor 83. Hereinafter, this belt stop position is referred to as "home position". The home position is also a position where an abnormal part in the scale pitch of the scale seal 10a is detected by the scale detecting sensor 80.

The intermediate transfer belt 10 stopped at the home position starts endless movement while the abnormal part in the scale pitch is detected by the scale detecting sensor 80 when the next image forming process is started. However, before the speed is stabilized, the abnormal part in the scale pitch is completely escaped from the position detected by the scale detecting sensor 80. After the abnormal part is escaped from the detection position, the feedback control is started as shown at S13 of FIG. 12.

If the image forming process is performed for one-sheet output, an output of a full color image is completed before the abnormal part in the scale pitch escaped from the detection position is turned by one round together with the endless movement of the belt to return to the detection position again. Therefore, such an event as follows does not possibly occur. That is, the abnormal part in the scale pitch is detected by the scale detecting sensor 80 through feedback control performed when optical writing is started or toner images of colors are superposedly transferred to thereby misrecognize the abnormality as a change in belt speed.

As explained above, by stopping the belt at the home position based on the result of detection by the mark detecting sensor 83, it is possible to avoid misalignment of superposed toner images due to the abnormal part in the scale pitch when the first sheet is output in the next operation.

The example, in which stopping the belt at the home position allows the sensor not to detect the abnormal part in the scale pitch during the feedback control when the first sheet is output in the next operation, has been explained, but the belt may be stopped at a position as follows. The abnormal part is detected by the sensor under the feedback control of driving the belt for the next image forming operation. However, the belt is stopped at a position where it is continued to be driven without detection of the abnormal part during a period from at least starting of superposing toner images of colors to its end. Further, the position is more preferably a position where the abnormal part is not detected even during the optical writing. This is because any device, in which the intermediate transfer belt 10 is in contact with the photosensitive element to form an intermediate transfer nip like the copying machine of the present invention, may change a circumferential speed of the photosensitive element in response to the change in belt speed, and deviate the optical writing position from an expected position. The sensor is prevented to detect the abnormal part in the scale pitch even during the optical writing to thereby avoid misalignment of toner images due to the deviation as well.

As explained above, in the copying machine, by stopping the belt at the home position, it is possible to avoid misalignment of the toner images, due to the abnormal part in the scale pitch that may occur in the first sheet to be output in the next operation. However, some problem remains in the output of the second sheet and thereafter. That is, if a plurality of images are output like continuous copying and continuous printing, the intermediate transfer belt 10 is endlessly moved more than one round, and therefore, the abnormal part is detected again by the sensor before the movement of the belt for image formation is stopped. Because of this, the change in belt speed is misrecognized, and misalignment of the toner images may occur in the output of the second sheet or thereafter.

Therefore, when the second sheet is to be output, the controller 82 starts optical writing of the electrostatic latent image of each color based on the timing of detecting the reference mark 10d. More specifically, at S16 of FIG. 12, if it is determined that some print job still remains, the second sheet and thereafter should be output.

The controller 82 waits for detection of the reference mark 10d by the mark detecting sensor 83 (S19), and then starts the optical writing for the following output (S14). Even if the second sheet or thereafter is to be output, it is avoided that the abnormal part in the scale pitch is detected during the optical writing or transfer for superposition. As explained above, the timing of starting optical writing and the timing of starting transfer for superposition are determined based on the result of detection by the mark detecting sensor 83 to avoid misalignment of toner images due to the abnormal part when the second sheet or thereafter is to be output.

It is also possible to avoid misalignment of images even when the first sheet is output, only by determining the timing of starting the optical writing based on the result of detection by the mark detecting sensor 83 without stopping the belt at the home position. For this purpose, the optical writing may be started after the reference mark 10d is detected when the first sheet is to be output. In this case, however, it sometimes takes quite long time required for outputting the first sheet. Assume that the belt is stopped at a slightly advanced position from the home position. Then, the intermediate transfer belt 10 is required to turn about one round within a period since the belt is started to be driven for the next operation until the mark detecting sensor 83 detects the reference mark 10d. During this time, the optical writing is not started, therefore, this time is wasted. On the other hand, if the belt is stopped at the home position, the processing since the next driving of the belt is started until the optical writing is started speedily proceeds, which makes it possible to avoid such a wasteful time.

When the scale seal 10a is contaminated, the light reflectivity at the high reflectivity parts 10c lowers to cause misrecognition of the change in belt speed. Therefore, a minimum threshold of a high voltage from the scale detecting sensor 80 is set, and if it is detected that a high voltage pulse wave is below the minimum threshold, a warning indicating contamination on the seal may be informed.

As explained above, in the image forming section including the image forming unit 20 of the copying machine according to the embodiment, the imaging units (process cartridges) disposed opposite to the intermediate transfer belt 10 form single-color toner images as visible images. Then, a tandem-type superposition is performed by sequentially superposing the toner images of the colors on the intermediate transfer belt 10 to form a four-color toner image as a multiple image. In such superposition, it is possible to set the circumference of the belt longer so as to complete the superposition with an amount of belt movement by less than one round.

Further, in the copying machine with such setting, the controller 82 controls the drive of the intermediate transfer belt 10 using the result of detection by the scale detecting sensor 80 and also the result of detection by the mark detecting sensor 83. Accordingly, it is possible to determine whether any abnormal part in the scale is found at a position detected by the scale detecting sensor 80 from the result of detection by the mark detecting sensor 83 disposed at the predetermined position above the intermediate transfer belt 10. Therefore, it is possible to perform drive control such that the occurrence of deficiency due to an abnormal part in the scale is suppressed.

In the embodiment, the drive of the intermediate transfer belt 10 is stopped based on the result of detection by the mark detecting sensor 83. More specifically, the intermediate transfer belt 10 is stopped at a position where the drive is allowed to be continued without detection of an abnormal part in the scale pitch by the scale detecting sensor 80, during at least the period since the toner images of colors are started to be superposed on one another until the end of the superposition in the following drive operation. Therefore, when the first sheet is to be output in the following image forming process, it is possible to avoid misalignment of the images due to misrecognition of the change in the detected scale pitch caused by an abnormal part in the scale pitch, as the change in the belt speed. As this control is performed without complicated feedback control, it is possible to avoid misalignment of the images under comparatively easier control.

Furthermore, the method of tandem type superposition is employed and the circumference of the belt is set long, and the controller 82 as the superposition controller is allowed to perform the following superposition. That is, the control is such that the timing of starting superposition is determined based on the result of detection by the mark detecting sensor 83. Under such control, when the second sheet and thereafter are to be output for continuous copying or continuous printing, it is possible to avoid misalignment of the images due to misrecognition of the change in the detected scale pitch caused by the abnormal part as the change in the belt speed.

The present invention is not limited to the embodiment, and various modifications as exemplified below are possible.

In the embodiment, the intermediate transfer belt 10 is stopped at the home position (position where an abnormal part in the scale is present at the position detected by the scale detecting sensor 80). However, if the belt is stopped at the home position all the time, the intermediate transfer belt 10 is left at the same position in a state where it is stretched. Therefore, curling of the belt occurs or an image is formed at the same portion of the belt. This causes the belt to be permanently deformed or the characteristic thereof to be changed, which makes the intermediate transfer belt 10 degraded more quickly. In a copying machine according to a modification of the present invention, the controller 82 determines the timing of stopping the drive of the belt so as to periodically shift the stop position of the intermediate transfer belt in the circumferential direction of the belt.

Even if the belt-drive stop position is shifted, as explained in the embodiment, it has to be avoided that an abnormal part in the scale passes through the position detected by the scale detecting sensor 80 when a visual image is transferred to the intermediate transfer belt 10. Therefore, a range where the intermediate transfer belt 10 can be stopped is restricted. Such a range is explained below with reference to FIG. 13.

Figure 13:
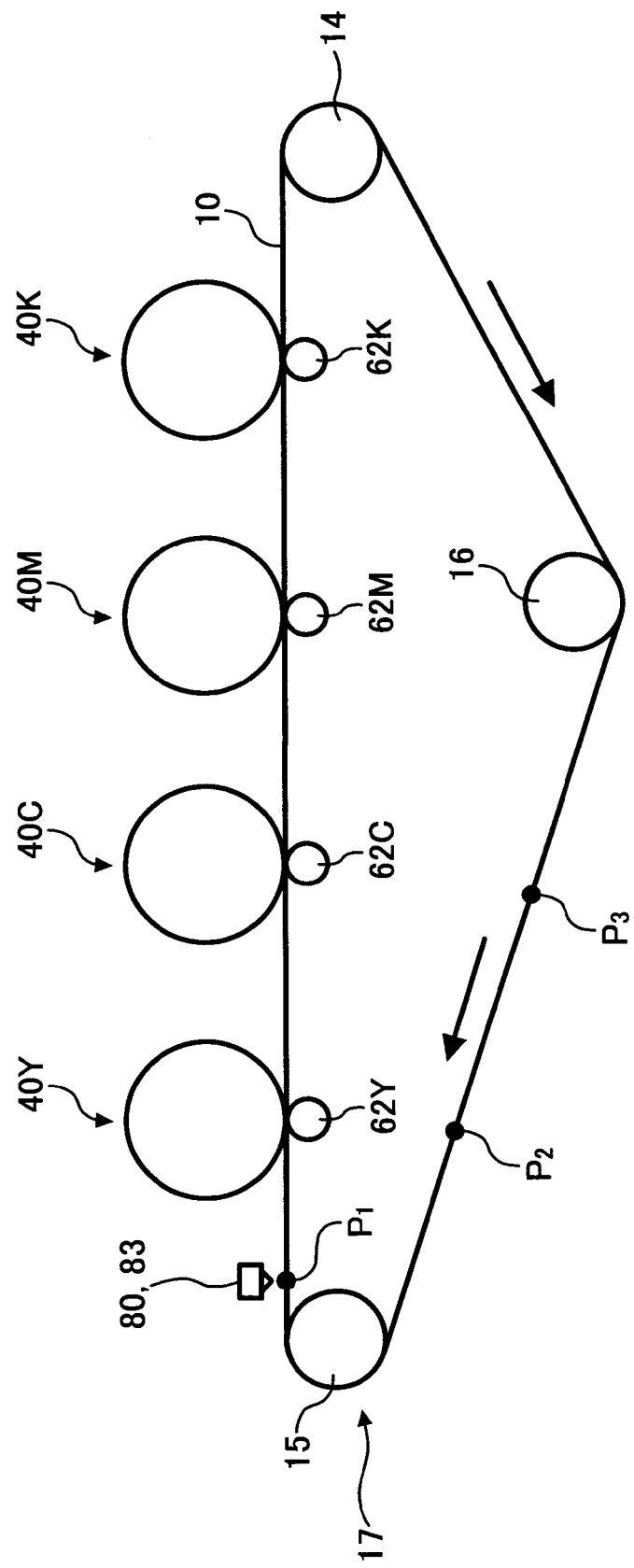
FIG. 13 is a schematic diagram of the intermediate transfer unit and photosensitive elements of the copying machine according to the embodiment.

FIG. 13 is an illustration of the key configuration of the intermediate transfer unit 17 and the photosensitive elements. A point P1 added on the intermediate transfer belt 10 indicates a belt portion where the reference mark 10d and the abnormal part in the scale pitch are present. As the intermediate transfer belt 10 is stopped at the home position as shown in FIG. 13, the point P1 is present at a position (position detected by the sensor) substantially right below the scale detecting sensor 80 and the mark detecting sensor 83. In the state as shown in FIG. 13, the intermediate transfer belt 10 is started to be driven from the home position for the following image forming process.

It is assumed that the start position of drive of the belt is gradually shifted from the home position, i.e., from the state of FIG. 13, in the advance direction of the belt, and that the belt is stopped immediately after one sheet is output regardless of whether the reference mark 10d is detected by the mark detecting sensor 83. If the circumference of the belt is longer than the length of the belt required for outputting an image for one sheet, at first the belt is stopped at a position before the position detected by the sensor.

The belt-drive start position is further shifted, and after a while, the belt is stopped at a position right before the point P1 reaches the position detected by the sensor. A point P2 in FIG. 13 represents a belt portion where the point P1 is stopped right before reaching the position to be detected by the sensor. Specifically, the belt portion has been present at the belt-drive start position and right below the position detected by the sensor. In other words, if the belt is started to be driven from the state in which the point P2 is present at the position detected by the sensor and is stopped immediately after one sheet is output, then the belt is stopped right before the home position.

The belt is started to be driven from the state in which the point P2 is present at the position detected by the sensor. If the belt is stopped when the reference mark 10d is detected by the mark detecting sensor 83, that is, when P1 reaches the position detected by the sensor, then the intermediate transfer belt 10 is stopped at the home position without complete turn by one round. Therefore, a maximum shift quantity (maximum shift quantity from the home position) of the belt-drive start position, that is, a range where the belt-drive start position is possibly set is a range from the point P1 and point P2. More specifically, this range is allowed to stop the intermediate transfer belt 10 at the home position with an amount of belt movement by less than one round.

The controller 82 shifts the belt-drive stop position within this range for each drive of the belt. More specifically, if the time required for moving the belt from the point P1 to the point P2 is 10x seconds, then a time lag since the reference mark is detected until the belt is stopped to be driven is set to 0x(=0 [sec]). By setting so, the intermediate transfer belt 10 can be stopped at the home position. Thereafter, the belt is stopped to be driven using a time lag value obtained by incrementing a magnification, by which x is multiplied, by one such as "1x, 2x, 3x, . . . ". In the operation of driving the belt after the time lag value is incremented up to 10x, the time lag value is reset to 0x. Under such control, it is possible to suppress the degradation of the intermediate transfer belt 10 by shifting the belt-drive stop position for each drive within the maximum range of the shift quantity.

The example of shifting the belt-drive stop position for each drive is explained, but the belt-drive stop position may be shifted at another timing at which the belt is turned for predetermined times. There is also a case where even if the shift quantity of a belt-drive stop position (or the belt-drive start position) is largely deviated from the maximum shift quantity, alignment due to abnormality in the scale pitch is sometimes suppressed. Assume that the belt-drive start position is further shifted in the advance direction of the belt, from the position where the point P2 is present right below the position detected by the sensor, and that one sheet of paper is output. Then, the belt is stopped at the position where the point P1 is further advanced than the position detected by the sensor. Therefore, the abnormal part in the scale pitch is detected during feedback control to cause the belt speed to be changed.

However, misalignment due to the change in the belt speed does not occur unless the transfer for superposition is started when the belt speed is changed. From this fact, the belt-drive stop position is further shifted, and finally, the change in belt speed due to the abnormal part in the scale pitch occurs when images are superposedly transferred. As explained above, the belt-drive start position is possibly shifted from the home position if the shift quantity is within a range where the speed is not changed, during which the transfer is actually performed. A point P3 as shown in FIG. 13 represents a critical point 3 in the range. Therefore, by shifting the belt-drive stop position within the range between the point P1 and the point P3, it is possible to avoid misalignment due to an abnormal part in the scale pitch.

However, if the position is shifted further from the point P2, then the optical writing is started after the belt is idly rotated about one round and the reference mark is detected when the second sheet and thereafter are to be output for continuous copying. In the output of the second sheet and thereafter, the belt is required to idly rotate about one round for each output, which causes consumption of a wasteful time. Therefore, it is desirable to keep the shift quantity within the maximum range of the shift quantity (P1 to P2) from a viewpoint of reduction in the time required for image formation.

In the copying machine according to the modification of the present invention, the timing of stopping the intermediate transfer belt is determined so that the controller 82 periodically shifts the drive start position of the intermediate transfer belt 10 in the circumferential direction of the belt. In such a configuration, it is possible to minimize degradation of the belt caused by always stopping the intermediate transfer belt at the same position to foster the permanent deformation or the change in characteristic of the belt.

In the embodiment, the copying machine using the intermediate transfer belt 10 with a scale obtained by bonding the scale seal 10a thereto is explained, but the intermediate transfer belt 10 may be calibrated by some other method such as printing and laser machining.

Further, the example of using the belt having the circumference longer than the reference which causes the detected scale pitch to be longer than the pitch reference value, is explained. However, the present invention is also applicable to an image forming apparatus using the belt in which the pitch is shorter than the pitch reference value.

Moreover, the example of using the reflective type photosensors as the scale detecting sensor 80 and the mark detecting sensor 83, is explained. However, the scale mark detector and the reference mark detector of the present invention are not limited thereto. The scale marks and the reference mark may be detected by some other method different from the method of detecting reflective light, for example, a method of detecting a through hole as a scale mark by a transmittance type photosensor.

The example of using the intermediate transfer belt 10 provided with the reference mark 10d at the same position as the abnormal part in the scale pitch in the circumferential direction of the belt, is explained, but the reference mark may be provided at a position different from the abnormal part in the circumferential direction thereof.

Furthermore, the example of providing the scale detecting sensor 80 and the mark detecting sensor 83 adjacent to each other in the lateral direction of the belt, is explained, but the respective positions may be shifted from each other in the circumferential direction of the belt.

In the embodiment, the example of providing both of the mark detecting sensor 83 and the scale detecting sensor 80 and the reference mark 10d is explained. More specifically, both of the sensors are provided so that the timing at which the reference mark 10d is detected by the mark detecting sensor 83 and the timing at which the abnormal part in the scale pitch passes through the position detected by the scale detecting sensor 80 are in synchronization with each other. However, both of the sensors may be provided so as to shift the respective detecting timings from each other. In other words, the timing at which the scale abnormal part passes through the position detected by the scale detecting sensor 80 may be obtained from the result of detection by the mark detecting sensor 83. Therefore, the positions where the sensors are provided are not limited to those in the embodiment.

That is, even if the reference mark 10d is provided at a position other than the scale abnormal part and the mark detecting sensor 83 and the scale detecting sensor 80 are provided at different positions from each other, that is different from the embodiment, the position of the scale abnormal part and the positions of arrangement of the reference mark 10d and the sensors are known information for the manufacturer of the copying machine. Therefore, even if the position where the reference mark 10d is provided and the positions where the sensors are arranged are different from those of the embodiment, a relation between a timing of detecting the reference mark 10d by the mark detecting sensor 83 and a timing of detecting the scale abnormal part by the scale detecting sensor 80 is obtained as known information.

Therefore, if the timing of detecting the reference mark 10d by the mark detecting sensor 83 is obtained, it is possible to obtain a timing at which the scale abnormal part passes through the position detected by the scale detecting sensor 80 by using the relation between the timings.

Consequently, it is possible to control the drive of the belt so that the scale abnormal part does not pass through the position detected by the scale detecting sensor 80 during image formation. Suppose the relation between the timings of detecting the reference mark 10d by the mark detecting sensor 83 and of detecting the scale abnormal part by the scale detecting sensor 80 indicates a timing as follows. That is, the timing, at which the scale detecting sensor 80 detects 100 pulses (corresponding to the number of scale marks) after the mark detecting sensor 83 detects the reference mark, is defined as the timing of detecting the scale abnormal part. In this case, the controller 82 counts the number of pulses detected by the scale detecting sensor 80 after the reference mark 10d is detected by the mark detecting sensor 83, and obtains a point in time at which the number of counts reaches 100 as a timing of detecting a scale abnormal part. Therefore, the drive of the belt may be controlled so that the image formation is not performed on the intermediate transfer belt 10 when the scale abnormal part passes through the sensor.

Further, the copying machine of executing feedback control based on the detected scale pitch Pr is explained in the embodiment. However, the feedback control may be executed based on the belt speed V obtained from the detected scale pitch.

The present invention is also applicable to a case in which visible images of toner images are superposed by using the direct recording method but not the electrophotographic method, like the image forming apparatus described in Japanese Patent Application Laid Open No. 2000-94374.

The present invention is also applicable not to an image forming apparatus but to a belt unit that includes at least a belt member, a scale mark detector, and a reference mark detector.

Furthermore, the example of controlling the drive speed of the belt drive motor as a drive source of the belt to suppress a change in the belt speed, is explained, but the change in the speed may be suppressed by another control method. It is also possible to suppress a change in belt speed by controlling a load by a load unit that applies the load to the belt and the stretching roller.

Misalignment may be suppressed not by suppressing the change in the belt speed but by changing some parameter based on the change in the belt speed. For example, in the direct recording method, it is possible to suppress the misalignment by controlling a fly-off timing of toner based on the change in the belt speed.

The tandem-type electrophotographic method is not employed, but a single-type electrophotographic method of executing transfer for superposition using only one imaging unit that includes an image carrier may be employed. However, the single-type electrophotographic method requires the belt member such as an intermediate transfer belt to be rotated several times until a multiple image of a four-color toner image is completed. Therefore, it takes longer time required for image formation of the single type as compared with that of the tandem type. Further, in the single type electrophotographic method, the belt member is rotated several times until the multiple image is completed, and the abnormal part in the scale pitch is repeatedly detected accordingly. Therefore, it is impossible to avoid the scale abnormal part from passing through the position detected by the scale detecting sensor 80 during image formation. Consequently, the speed is changed during image superposition even if the belt-drive stop position and the optical-write start position are controlled based on the result of detecting the reference mark.

Figure 14:
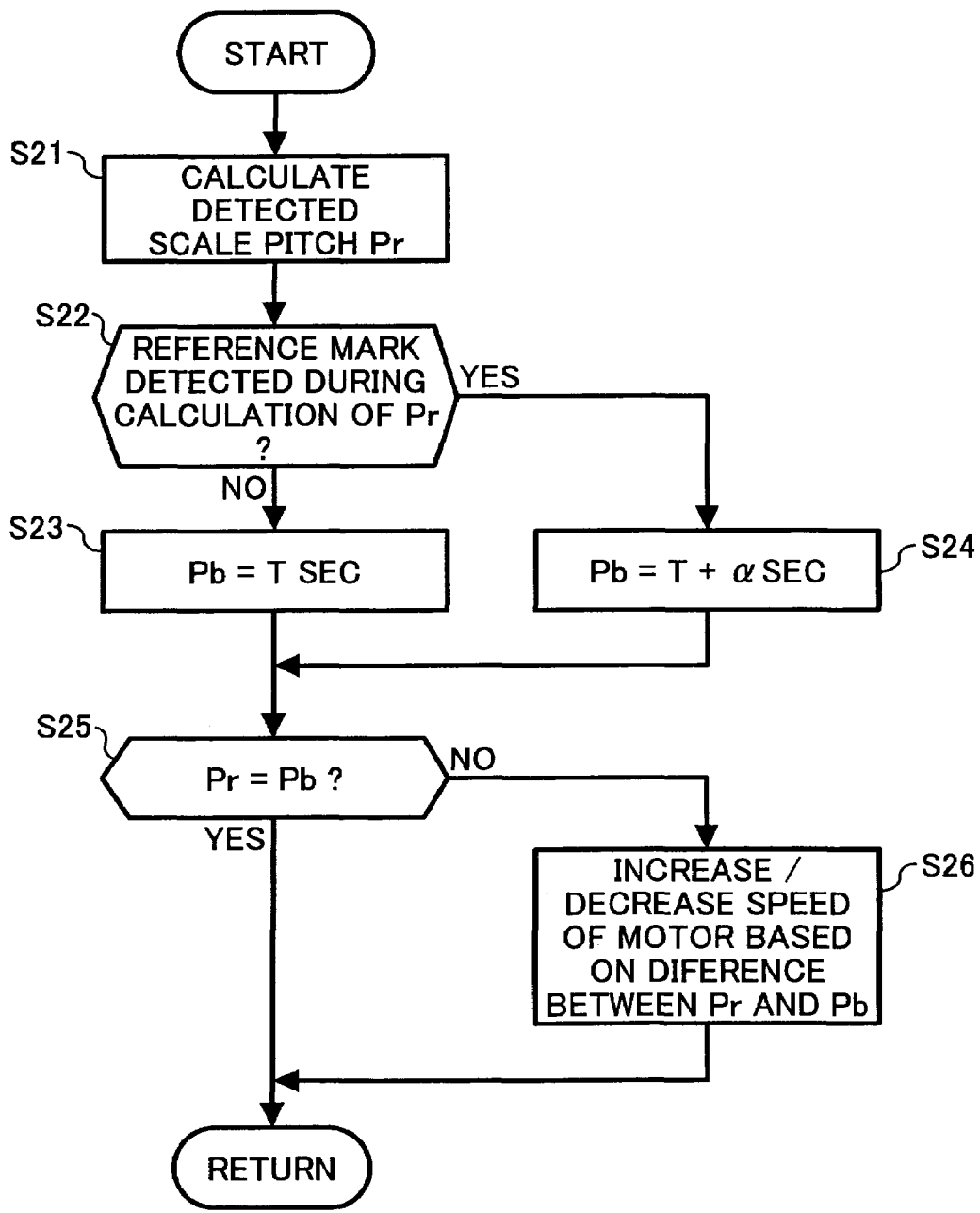
FIG. 14 is a flowchart of feedback control applicable to an image forming apparatus that superposes images using a single imaging unit.

In the single-type electrophotographic method, the controller 82 may control the drive of the belt as shown in FIG. 14. At first, a detected scale pitch Pr is calculated (S21), and it is determined whether the reference mark has been detected during the calculation (S22). If the reference mark has not been detected (No at S22), then the detected scale pitch Pr is calculated based on a detected pitch between scale marks with regularly spaced pitches.

Therefore, a normal T second is selected as a pitch reference value Pb (S23), and Pr and Pb are compared (S25). On the other hand, if the reference mark has been detected during calculation of the detected scale pitch Pr (Yes at S22), then the detected scale pitch Pr is calculated based on a detected pitch between scale marks with an abnormal part in scale pitch. Therefore, a value of adding α to the normal T second is selected as the pitch reference value Pb (S24), and Pr and Pb are compared.

In the case of the abnormal part in the scale pitch, the belt speed is controlled based on the comparison between the detected scale pitch and the appropriate pitch reference value. Therefore, it is possible to avoid a situation where the change in the detected scale pitch due to the abnormal part is misrecognized as the change due to the change in the belt speed, and also possible to avoid misalignment due to the misrecognition.

As explained above, by switching the pitch reference value based on the result of detecting the reference mark, it is possible to avoid misalignment due to the misrecognition even in an image forming apparatus employing the single-type electrophotographic method. However, as is obvious from the comparison with the flowchart of FIG. 8, the contents of calculation for the feedback control is more complicated as compared with the ordinary calculation. Therefore, it is required to provide a calculating unit that performs high speed processing.

In the modification, like in the embodiment, the control is performed in the case where the reference mark 10*d* and the scale abnormal part are provided at substantially the same positions and the mark detecting sensor 83 and the scale detecting sensor 80 are provided at substantially the same positions. However, different from the embodiment, it is also possible to minimize the deficiency in the image formation due to the misrecognition even if the reference mark 10*d* is provided at a position other than the scale abnormal part and the mark detecting sensor 83 and the scale detecting sensor 80 are provided at different positions.

In other words, it is possible to determine whether the scale abnormal part has passed through the position detected by the scale detecting sensor 80 from the result of detection by the mark detecting sensor 83. Therefore, instead of the processing at S22 of FIG. 14, it is determined whether the scale abnormal part has passed through the position detected by the scale detecting sensor 80 based on the result of detection by the mark detecting sensor 83, and the following control may be performed according to the result of detection as follows. That is, if the scale abnormal part has passed through the position detected thereby, then the process proceeds to S24. On the other hand, if it has not passed through the position detected thereby, then the process proceeds to S23. By differently controlling the belt depending on whether the scale abnormal part has passed through the position detected by the scale detecting sensor 80, it is possible to minimize the deficiency in the image formation due to the misrecognition.

Furthermore, by performing image formation on the intermediate transfer belt 10 and stopping the belt at the home position, it is prevented to perform the transfer operation on the belt at the timing at which the scale abnormal part passes through the position detected by the scale detecting sensor 80. The belt is driven not from the home position for each image formation, but may be driven by the following control. The control is explained below with reference to the flowchart of FIG. 15.

The controller 82 obtains a positional relation between the position on the belt detected by the scale detecting sensor 80 and the scale abnormal part based on the result of detection by the mark detecting sensor 83 and the result of detection by the scale detecting sensor 80. More specifically, a length from a position on the belt currently detected by the scale detecting sensor 80 to the scale abnormal part is obtained (S152). The length may be a time length or a value corresponding to a distance.

In order to obtain the positional relation, the controller 82 checks the position of the belt at any time. For example, by counting the number of pulses detected by the scale detecting sensor 80 based on the timing of detecting the reference mark 10*d* by the mark detecting sensor 83 as a start point, the controller 82 can recognize the position of the belt in such a manner that it is in an n-th pulse from the reference position.

Figure 15:
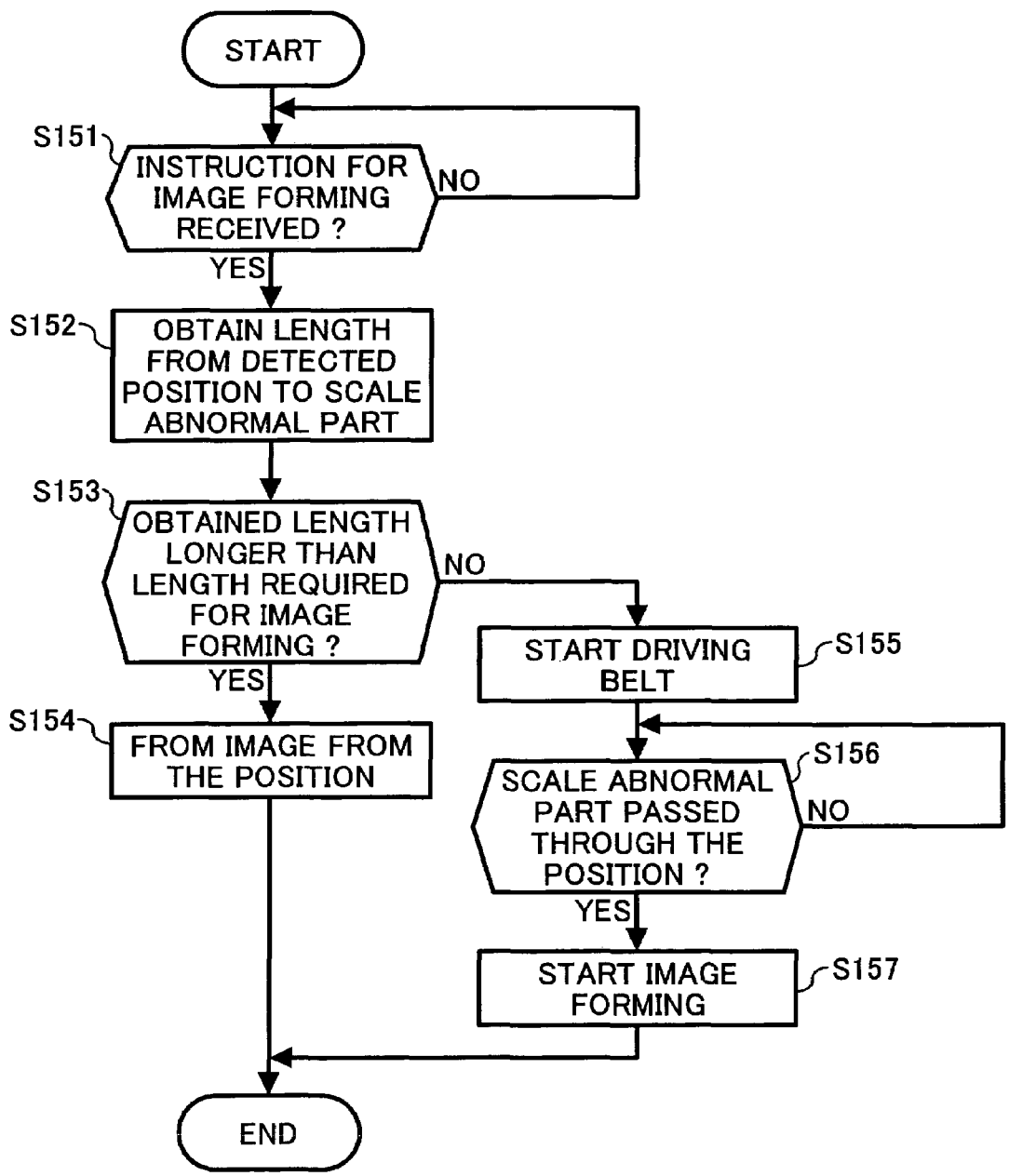
FIG. 15 is a flowchart of a modification of belt drive control by the controller.

As shown in FIG. 15, if an instruction to perform image formation has been received (Yes at S151), the length from the position on the belt detected by the scale detecting sensor 80 to the scale abnormal part is obtained from the result of detection by the scale detecting sensor 80 at that point. Here, as the relation between the position where the reference mark 10d is provided and the scale abnormal part is known, the information based on the positional relation is previously stored in the controller 82. Specifically, the information includes one indicating that the scale abnormal part passes through the detection position at a point in time at which the pulse is counted by 100 after the reference mark is detected. Based on the information, the controller 82 can recognize the positional relation at that time between the position detected by the scale detecting sensor 80 and the scale abnormal part.

The controller 82 obtains a length from the position on the belt currently detected by the scale detecting sensor 80 to the scale abnormal part, and compares the obtained length with the length of the belt (amount of belt movement) required for image formation for one sheet that is previously stored therein. If the obtained length is longer than the required length of the belt, the controller 82 starts driving the belt and allows the image formation to be performed from the start position (S154).

On the other hand, if the obtained length is shorter than the length of the belt required for image formation for one sheet, then the controller 82 starts driving the belt (S155) but does not perform the image formation, and determines whether the scale abnormal part has passed through the position detected by the scale detecting sensor 80 (S156). If the scale abnormal part has passed through the detection position (Yes at S156), then the controller 82 controls so as to allow the image formation to be performed from that point (S157).

When the image formation is to be performed in the above manner, a length from the position on the belt currently detected by the scale detecting sensor 80 to the scale abnormal part is obtained, and the obtained length is compared with the length of the belt (amount of belt movement) required for image formation for one sheet that is previously stored therein. If the obtained length is shorter than the length of the belt, then the processing of image formation waits until the scale abnormal part passes through the detection position. Therefore, it is possible to prevent a change in the belt speed caused by passage of the scale abnormal part through the detection position during transfer of images to the intermediate transfer belt 10.

As explained above, image formation is possible by making effective use of the length of the belt as much as possible, while avoiding the deficiency caused by passage of the scale abnormal part through the detection position. Therefore, it is possible to obtain an improved operation speed of image formation while minimizing degradation in image quality.

Furthermore, in the embodiment, the case where the present invention is applied to the copying machine which includes the process cartridges 18Y, 18C, 18M, and 18K as a plurality of imaging units that superpose images of colors to the intermediate transfer belt 10 to form a color image, is explained. However, the present invention is also applicable to an image forming apparatus for forming a monochrome image. In this case, the image quality may also be degraded if the belt speed is changed due to the scale abnormal part when the image is transferred from the image carrier to the transfer belt. However, in the present invention, the change in the speed due to the scale abnormal part is suppressed, thus it is possible to reduce degradation in image quality.

By starting the operation of image formation from the home position (see FIG. 12), the scale abnormal part is prevented to pass through the position detected by the scale detecting sensor 80 during a period from the start of driving the belt to the end of a series of the image formation. In addition to this example, the belt may be started to be driven from a position at which the scale abnormal part passes through the detection position within a period since the belt is started to be driven until the drive of the belt is stabilized. In other words, the drive of the belt for the previous image formation is ended at a position slightly before the home position (the position where the scale abnormal part passes through the detection position), and the belt is started to be driven from the position for the next operation of image formation.

In the first place, the feedback control is not performed in a period since the belt is started to be driven until the driving is stabilized, and actual transfer is not performed as well. Therefore, by allowing the scale abnormal part to pass through the detection position during the period, degradation in image quality such as misalignment of images does not occur. As a result, by driving the belt at the timing at which the scale abnormal part passes through the detection position during the period, it is possible to make effective use of the length of the belt and prevent degradation in image quality due to scale abnormal part.

As explained above, according to one aspect of the present invention, if a scale abnormal part is prior knowledge, then it is possible to grasp a positional relation between the scale abnormal part and the position detected by the scale mark detector from the result of detecting the reference mark.

According to another aspect of the present invention, it is possible to perform belt drive control so as to avoid deficiency caused by passage of the scale abnormal part through the position detected by the scale mark detector.

Furthermore, it is possible to perform the belt drive control so as to suppress misalignment caused by passage of the scale abnormal part through the position detected by the scale mark detector.

Moreover, it is possible to perform the belt drive control so as to suppress misalignment occurring when visible images created by the imaging units are sequentially superposed on the belt member to form a multiple image.

Furthermore, as the belt-drive start position is periodically shifted to the circumferential direction of the belt, it is possible to minimize degradation in the belt such as permanent deformation or change in characteristic due to stopping of the belt always at the same position.

Moreover, it is possible to drive the belt in such a manner that a reference value used for control is switched between the case where the scale abnormal part passes through the position detected by the scale mark detector and the case where it does not pass through the position detected thereby.

Furthermore, it is possible to minimize occurrence of deficiency due to a scale abnormal part by performing different control depending on the case where the scale abnormal part passes through the position detected by the scale mark detector and the case where it does not pass through the position detected thereby.

Moreover, it is possible to minimize occurrence of deficiency due to passage of the scale abnormal part through the position detected by the scale mark detector.

Furthermore, it is possible to perform the belt drive control so as to avoid deficiency due to passage of the scale abnormal part through the position detected by the scale mark detector.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A belt unit comprising:
   a belt member that makes an endless movement;
   a plurality of scale marks arranged on a surface of the belt member at a certain pitch in a circumferential direction, wherein the plurality of scale marks includes an abnormality in the pitch of the scale marks;
   a scale mark detector that detects the scale marks;
   a reference mark provided at a predetermined position relative to the abnormality, on the surface of the belt member; and
   a reference mark detector that detects the reference mark.

2. An image forming apparatus comprising:
   a belt member that makes an endless movement;
   a plurality of scale marks arranged on a surface of the belt member at a certain pitch in a circumferential direction, wherein the plurality of scale marks includes an abnormality in the pitch of the scale marks;
   a scale mark detector that detects the scale marks;
   a reference mark provided at a predetermined position relative to the abnormality, on the surface of the belt member;
   a reference mark detector that detects the reference mark;
   a belt drive controller that controls driving of the belt member based on results of detections by the scale mark detector and the reference mark detector; and
   an image forming unit that forms a toner image on the belt member.

3. The image forming apparatus according to claim 2, wherein the image forming unit includes a plurality of imaging units, wherein each of the imaging units forms a toner image on the belt member, and each of the toner images are superposed to form a combined image on the belt member.

4. The image forming apparatus according to claim 3, wherein the image forming unit further includes a superposition controller that controls a timing of superposing the toner images on the belt member based on the result of the detection by the reference mark detector.

5. An image forming apparatus comprising:
   a belt member that makes an endless movement;
   a plurality of scale marks arranged on a surface of the belt member in a circumferential direction;
   a scale mark detector that detects the scale marks;
   a reference mark provided at a predetermined position on the surface of the belt member;
   a reference mark detector that detects the reference mark;
   a belt drive controller that controls driving of the belt member based on results of detections by the scale mark detector and the reference mark detector; and
   an image forming unit that forms a toner image on the belt member,
   wherein the image forming unit includes a plurality of imaging units, wherein each of the imaging units forms a toner image on the belt member, and each of the toner images are superposed to form a combined image on the belt member, wherein the belt drive controller stops driving the belt member based on the result of the detection by the reference mark detector upon completion of formation of the combined image.

6. The image forming apparatus according to claim 5, wherein the belt drive controller determines a stop timing of the belt member in such a manner that a driving start position of the belt member is periodically changed in the circumferential direction to thereby vary a stopping position of the belt member.

7. An image forming apparatus comprising:
   a belt member that makes an endless movement;
   a plurality of scale marks arranged on a surface of the belt member in a circumferential direction;
   a scale mark detector that detects the scale marks;
   a reference mark provided at a predetermined position on the surface of the belt member;
   a reference mark detector that detects the reference mark;
   a belt drive controller that controls driving of the belt member based on results of detections by the scale mark detector and the reference mark detector; and
   an image forming unit that forms a toner image on the belt member,
   wherein the belt drive controller controls the driving of the belt member based on a comparison between the result of the detection by the scale mark detector and a preset reference value, and adjusts the preset reference value based on the result of the detection by the reference mark detector.

8. An image forming apparatus comprising:
   a belt member that makes an endless movement;
   a plurality of scale marks arranged on a surface of the belt member in a circumferential direction;
   a scale mark detector that detects the scale marks;
   a reference mark provided at a predetermined position on the surface of the belt member;
   a reference mark detector that detects the reference mark;
   a belt drive controller that controls driving of the belt member based on results of detections by the scale mark detector and the reference mark detector; and
   an image forming unit that forms a toner image on the belt member,
   wherein the belt drive controller determines existence of an abnormal part of the scale marks based on the result of the detection by the reference mark detector, and if the existence of the abnormal part is determined, performs a different drive control than a drive control performed without the existence of the abnormal part.

9. An image forming apparatus comprising:
   a belt member that makes an endless movement;
   a plurality of scale marks arranged on a surface of the belt member in a circumferential direction;
   a scale mark detector that detects the scale marks;
   a reference mark provided at a predetermined position on the surface of the belt member;
   a reference mark detector that detects the reference mark;
   a belt drive controller that controls driving of the belt member based on results of detections by the scale mark detector and the reference mark detector; and
   an image forming unit that forms a toner image on the belt member, wherein the belt drive controller further controls the driving of the belt member based on the result of the detection by the reference mark detector in such a way that an abnormal part of the scale marks is not detected during a series of image forming operation on the belt member by the image forming unit.

10. The image forming apparatus according to claim 9, wherein the belt drive controller starts the driving of the belt member from a position immediately after the abnormal part is detected.

11. The image forming apparatus according to claim 9, wherein the belt drive controller starts the driving of the belt member from a position immediately before the abnormal part is detected.

12. An image forming apparatus comprising:
a belt member that makes an endless movement;
a plurality of scale marks arranged on a surface of the belt member in a circumferential direction;
a scale mark detector that detects the scale marks;
a reference mark provided at a predetermined position on the surface of the belt member;
a reference mark detector that detects the reference mark;
a belt drive controller that controls driving of the belt member based on results of detections by the scale mark detector and the reference mark detector; and
an image forming unit that forms a toner image on the belt member,
wherein the belt drive controller obtains a first length from a position detected by the scale mark detector to an abnormal part of the scale marks, based on the results of the detections by the reference mark detector and the scale mark detector, and when forming the toner image on the belt member, compares the first length currently obtained with a second length that is required for forming the toner image, and
the image forming unit forms the toner image on the belt member starting from the currently detected position if the first length is longer than the second length, and forms the toner image on the belt member after detecting the abnormal part if the second length is longer than the first length.

13. A method for controlling driving of a belt member for an image forming apparatus that includes the belt member that makes an endless movement, a plurality of scale marks arranged at a certain pitch on a surface of the belt member in a circumferential direction, wherein the plurality of scale marks includes an abnormality in the pitch of the scale marks at a known location on the belt member, a reference mark provided at a predetermined position relative to the abnormality at the known location on the belt member on the surface of the belt member, and an image forming unit that forms a toner image on the belt member, the method comprising:
detecting the scale marks;
detecting the reference mark at the predetermined position relative to the abnormality at the known location on the belt member, wherein the known location is known at the time of the step of detecting the reference mark; and
controlling the driving of the belt member based on results of detecting the scale marks and detecting the reference mark.

14. A belt unit comprising:
a belt member that makes an endless movement;
a plurality of scale marks arranged on a surface of the belt member at a certain pitch in a circumferential direction, wherein the plurality of scale marks includes an abnormality in the pitch of the scale marks at a known location on the belt member;
a scale mark detector that detects the scale marks and the abnormality in the pitch of the scale marks, wherein the scale mark detector is adapted to detect the abnormality whose location is known at the time of detection by the scale mark detector.

15. A belt unit comprising:
a belt member that makes an endless movement;
a plurality of scale marks arranged on a surface of the belt member at a certain pitch in a circumferential direction, wherein the plurality of scale marks includes an abnormality in the pitch of the scale marks at a known location on the belt member;
a scale mark detector; and
means for detecting the abnormality in the pitch of the scale marks, wherein the location of the abnormality is known at the time of detection by the scale mark detector.

* * * * *